(12) United States Patent
Ueda et al.

(10) Patent No.: US 7,661,000 B2
(45) Date of Patent: Feb. 9, 2010

(54) INFORMATION PROCESSING DEVICE, INFORMATION RECORDING MEDIUM AND INFORMATION PROCESSING METHOD, AND COMPUTER PROGRAM

(75) Inventors: Kenjiro Ueda, Kanagawa (JP); Katsumi Muramatsu, Tokyo (JP); Tateo Oishi, Saitama (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 465 days.

(21) Appl. No.: 10/595,960

(22) PCT Filed: Nov. 15, 2005

(86) PCT No.: PCT/JP2005/020968

§ 371 (c)(1),
(2), (4) Date: May 22, 2006

(87) PCT Pub. No.: WO2006/061976

PCT Pub. Date: Jun. 15, 2006

(65) Prior Publication Data

US 2007/0098167 A1 May 3, 2007

(30) Foreign Application Priority Data

Dec. 7, 2004 (JP) ............... P2004-353637

(51) Int. Cl.
*G06F 12/14* (2006.01)
*H04L 9/00* (2006.01)
*H04N 7/167* (2006.01)

(52) U.S. Cl. .................. 713/193; 380/28; 380/217

(58) Field of Classification Search ............ None
See application file for complete search history.

(56) References Cited

U.S. PATENT DOCUMENTS

| | | | | |
|---|---|---|---|---|
| 5,548,648 A * | 8/1996 | Yorke-Smith | ............... | 713/193 |
| 5,995,623 A | 11/1999 | Kawano et al. | | |
| 6,021,199 A * | 2/2000 | Ishibashi | ............... | 380/217 |
| 6,526,144 B2 * | 2/2003 | Markandey et al. | ............... | 380/28 |
| 7,278,031 B1 * | 10/2007 | Best | ............... | 713/193 |

FOREIGN PATENT DOCUMENTS

| | | | |
|---|---|---|---|
| GB | 2304009 A * | 3/1997 | |
| JP | 7-281596 | 10/1995 | |
| JP | 9-270785 | 10/1997 | |
| JP | 10-145773 | 5/1998 | |
| JP | 2004-342246 | 12/2004 | |

* cited by examiner

*Primary Examiner*—Kaveh Abrishamkar
(74) *Attorney, Agent, or Firm*—K&L Gates LLP

(57) ABSTRACT

A configuration is provided which improves scrambling processing of content and eliminates unauthorized use of content. Scramble rules which differ for each content are used for content scrambling processing. For example, in the event of using shuffling processing, various shuffle states are specified as scramble rules. In the event of using Exclusive-OR processing, a value applicable to EXOR is specified as the scramble rule. Also, in the event of using rotation processing, a shift amount is specified as the scramble rule. In the event of using 32 shuffle elements in shuffling processing, 32! different shuffle states, that is to say, 32! different scramble rules can be specified. Also, the values for EXOR or the rotation shift amount can be set as various values, and many scramble rules can be set.

34 Claims, 30 Drawing Sheets

FIG. 3

| INDEX DISTINGUISHABLE BY APPLICATION LAYERS SUCH AS TITLE | CONTENT MANAGEMENT UNIT (CPS) | SCRAMBLE RULE |
|---|---|---|
| TITLE 1 | CPS1 | Scr#1 |
| TITLE 2 | CPS1 | Scr#1 |
| APPLICATION 1 | CPS2 | Scr#2 |
| APPLICATION 2 | CPS3 | Scr#3 |
| .. | .. | .. |
| DATA GROUP 1 | CPS4 | Scr#4 |
| DATA GROUP 2 | CPS5 | Scr#5 |
| .. | .. | .. |

FIG. 9

(A) SCRAMBLE RULE (IN THE EVENT THAT THERE ARE 32 SHUFFLE ELEMENTS WITHIN THE SHUFFLE UNIT)

| 3 | 19 | 16 | 24 | 26 | 18 | 10 | 2 |
|---|---|---|---|---|---|---|---|
| 28 | 20 | 12 | 4 | 1 | 15 | 25 | 9 |
| 22 | 11 | 21 | 31 | 7 | 29 | 13 | 23 |
| 5 | 17 | 27 | 14 | 8 | 6 | 32 | 30 |

(B1) BEFORE SHUFFLING

| 1 | 2 | 3 | 4 | 5 | 6 | 7 | 8 | 9 | 10 | 11 | 12 | ... | 28 | 29 | 30 | 31 | 32 |

(B2) AFTER SHUFFLING

| 3 | 19 | 16 | 24 | 26 | 18 | 10 | 2 | 28 | 20 | 12 | 4 | ... | 14 | 8 | 6 | 32 | 30 |

Aligned Unit (6KB ENCRYPTION)

CBC (Cipher Block Chaining) MODE (ENCRYPTED)

User Sector Data (2KB ENCRYPTION)

FIG. 13  MSTBL.DA (THELP FILE FOR ENCRYPTING IN DISK PLANT)

```
Li_MSTBL.DAT(){                     #bits   value
    UD_START_Location                32
    UD_END_Location                  32
    CHT_Location                     32
    CHT_Offset                       32
    Content_Cert_Location            32
    Content_Cert_Offset              32
    UK_Inf_Location                  32
    UK_Inf_Offset                    32
    Num_of_UK                        32
    MKB_Location                     32
    For ( j = 1; j =<N, j++ ) {
        Encryption_Flag(j)            8     $00_{16}$: not to-be-encrypted
                                            $01_{16}$: to-be-encrypted
        Data_Type(j)                  8     $01_{16}$: 1st sector of AU
                                            $02_{16}$: 2nd sector of AU
                                            $03_{16}$: 3rd sector of AU
                                            $04_{16}$: Non-AV data (e.g. Java)
        CPS_Unit_No(j)               16     $0000_{16}$-$FFFF_{16}$
        Clip_AV_File_No(j)           24     00000-99999
        Reserved                      6     $000000_{2}$
        Last_Sector_of_Clip(j)        1     $0_{2}$: not Last Sector of each Clip
                                            $1_{2}$: Last Sector of each Clip
        Last_Sector_of_Layer(j)       1     $0_{2}$: not Last Sector of each Clip in layer i
                                            $1_{2}$: Last Sector of each Clip in each layer i
    }
}
```

FIG. 14

SYNTAX OF MSTBL.DAT

UD_START_Location: Physical Sector Number OF START LOCATION OF User Data FOR EACH Layer (Data Zone)
UD_END_Location: Physical Sector Number OF END LOCATION OF User Data FOR EACH Layer (Data Zone)
CHT_Location: Physical Sector Number of CHT START LOCATION.
CHT_Offset: NUMBER OF BYTES UNTIL DIRECTLY BEFORE Hash Value (DATA TO BE FILLED IN BY Mastering Facility) AND START LOCATION OF CHT.
Content_Cert_Location: Physical Sector Number of Content Certificate START LOCATION.
Content_Cert_Offset: NUMBER OF BYTES UNTIL DIRECTLY BEFORE Content ID (DATA TO BE FILLED IN BY Mastering Facility) AND START LOCATION of Content Certificate.
UK_Inf_Location: Physical Sector Number OF TITLE KEY FILE START LOCATION. IF NO Unit_Key.inf STORED IN THAT Layer, SPECIFY $00000000_{16}$.
UK_Inf_Offset: NUMBER OF BYTES UNTIL DIRECTLY BEFORE Encrypted Unit Key for CPS Unit #1 and THE START LOCATION OF Unit_Key.inf.
Num_of_UK: NUMBER OF Unit Keys OF ENTIRE Disc (= NUMBER OF CPS Units).
MKB_Location: Physical Sector Number OF MKB START LOCATIONS. IN THE EVENT THAT NO MKB_Cert IS STORED, SPECIFY $00000000_{16}$.
N: Logical Sector NUMBER OF Layer i.
Encryption_Flag: Flag FOR WHETHER OR NOT TO ENCRYPT.
Data_Type: Flag SHOWING Type OF Sector.
CPS_Unit_No: CPS Unit Number.
Clip_AV_File_No: CLIP FILE NUMBER. INFORMATION TO BE USED FOR THE PURPOSE OF CHT CREATION.
Last_Sector_of_Clip: FLAG SHOWING LAST Sector OF EACH CLIP (REGARDLESS OF Layer).
Last_Sector_of_Layer: FLAG SHOWING LAST Sector OF EACH CLIP IN EACH Layer.

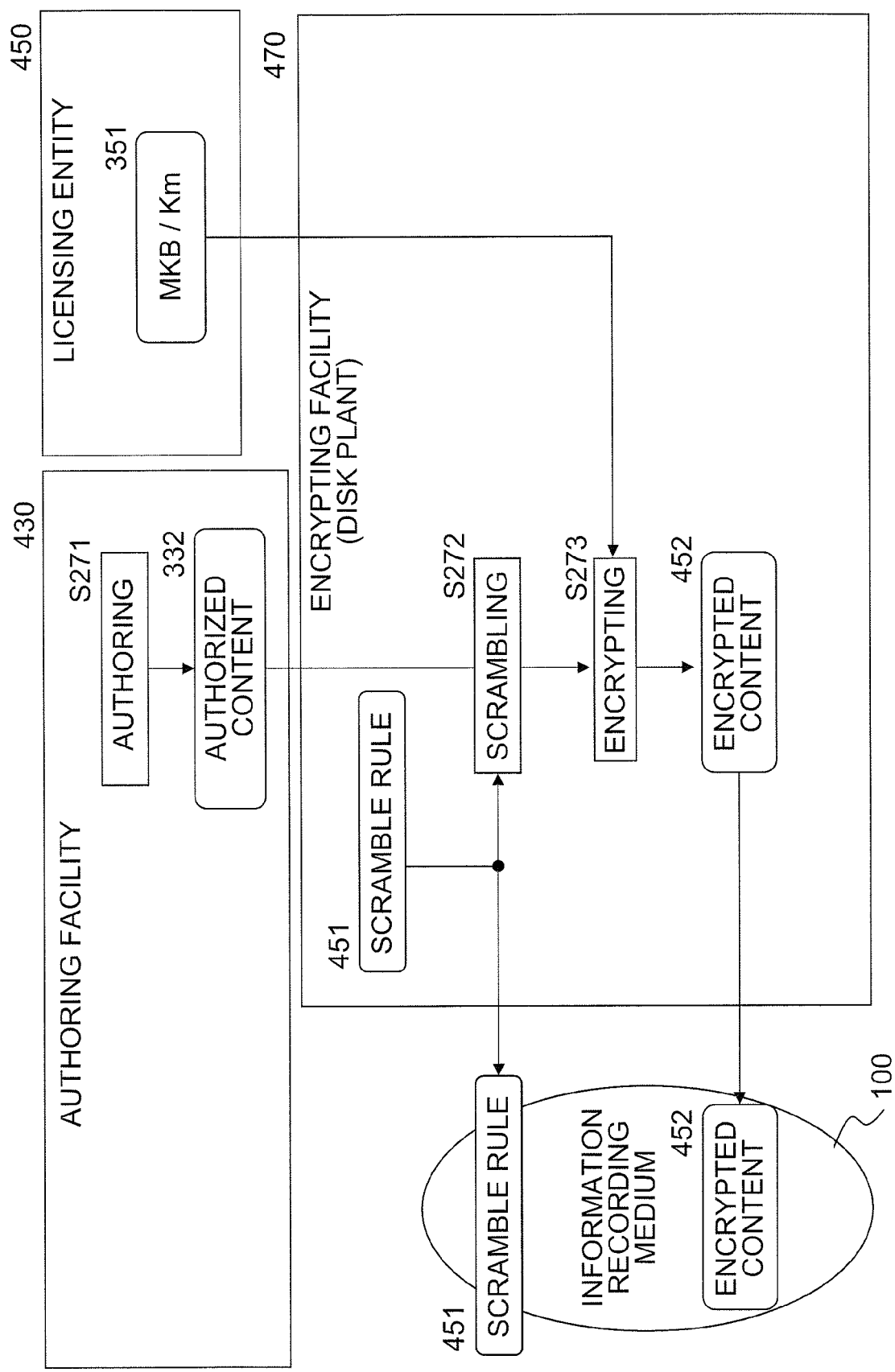

FIG. 18

(A) SYNTAX OF source_packet

| | #bits |
|---|---|
| source_packet(){ | |
| TP_extra_header() | 4 |
| transport_packet() | 188 |
| } | |

(B) SYNTAX OF TP_extra_header

| | #bits |
|---|---|
| TP_extra_header(){ | |
| is_not_free | 1 |
| is_encrypted | 1 |
| arrival_time_stamp | 30 |
| } | |

FIG. 19

SYNTAX OF transport_packet

```
                                                                              #bits
transport_packet(){
    sync_byte                                                                   8
    transport_error_indicator                                                   1
    payload_unit_start_indicator                                                1
    transport_priority                                                          1
    PID                                                                        13
    transport_scrambling_contorl                                                2
    adaptation_field_control                                                    2
    continuity_counter                                                          4
    if (adaptation_field_control==' || adaptation_filed_control=='11') {
        adaptation field()
    }
    if (adaptation_field_control==' || adaptation_filed_control=='11') {
        adaptation field()
    }
    if (adaptation_field_control==' || adaptation_filed_control=='11') {
        for (i=0; i<N; i++) {
            data_byte                                                           8
        }
    }
}
```

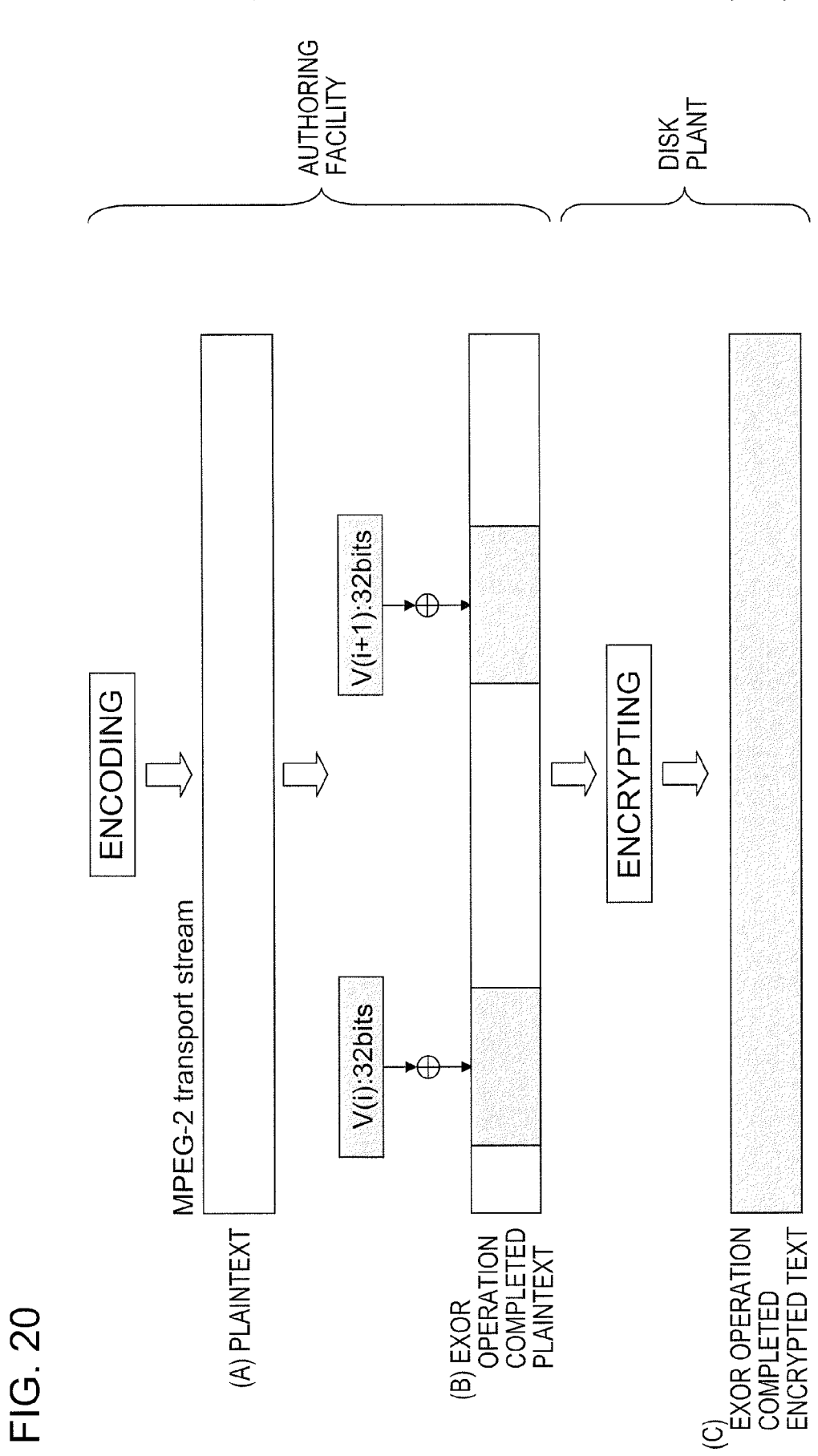

FIG. 21

V(1):0xXXXXXXXX;
V(2):0xXXXXXXXX;
V(3):0xXXXXXXXX;
...
V(n-1):0xXXXXXXXX;
V(n):0xXXXXXXXX;

INFORMATION PROCESSING DEVICE, INFORMATION RECORDING MEDIUM AND INFORMATION PROCESSING METHOD, AND COMPUTER PROGRAM

CROSS REFERENCE TO RELATED APPLICATIONS

The present application claims priority to Japanese Patent Document No. P2003-353637 filed on Dec. 7, 2004, the disclosure of which is herein incorporated by reference.

BACKGROUND

The present invention relates to an information processing device, information recording medium and information processing method, and computer program, and more particularly relates to an information processing device, information recording medium and information processing method, and computer program which eliminates unauthorized content and realizes strict content usage management, by using an advanced scrambling process for the various content requested of the content usage management.

In general, various software data, such as audio data such as music, image data such as movies, game programs, and various application programs (hereafter, referred to as Content) can be stored as digital data in recording media, for example, a Blu-ray disk which uses blue laser, or on a DVD (Digital Versatile Disc), MD (Mini Disc), or CD (Compact Disc). In particular, the Blu-ray disk which uses blue laser is a disk capable of high density recording, and can record large volumes of movie content and the like as high image quality data.

Digital content is stored on such various information recording media (recording media), and is provided to users. A user plays back the content on a playback device such as a PC (Personal Computer) or disk player owned by the user to use the product.

Much content such as music data and image data generally has the creator name thereof or distribution rights to the distributor thereof stored therein. Accordingly, generally distribution of such content has certain usage restrictions, this is to say, permission to use the content is granted only for authorized users, and steps are taken so that duplication is not performed without permission.

With a digital recording device and recording medium, recording and playback can be performed repeatedly without deterioration in the image or audio thereof for example, and there is a problem of proliferation of unauthorized copied content being distributed via the internet, or so-called pirated disks being shared, where content is copied onto a CD-R or the like, or copied content is stored on a hard disk such as a PC and used.

With a high-capacity recording medium such as a DVD or a recording medium using a blue laser of which development has been advanced in recent years, digital information of a large amount of data such as one to several movies for example can be recorded onto one medium. Thus, as image information and so forth becomes easier to be recorded as digital information, preventing unauthorized copying and protecting the copyrights becomes an increasingly difficult problem. Currently, various technology is in use to prevent unauthorized copying on digital recording devices and recording media, in order to prevent the unauthorized copying of such digital data.

For example, with a DVD player, a Content Scramble System is being used. With a Content Scramble System, for example a DVD-ROM (Read Only Memory) has a configuration wherein the video data or audio data is encrypted and recorded, and content playback is performed by reversing the scrambling.

With descrambling processing, processing must be executed such as using specified data such as a key provided to a DVD player which has been granted a license. A license is granted to DVD players which are designed to follow predetermined operation restrictions such as not performing unauthorized copying. Accordingly, with a DVD player which has a license, the specific data such as the provided key is used, and the data recorded on the DVD-ROM is descrambled, and thus images or audio can be played back from the DVD-ROM.

On the other hand, a DVD player which does not have a license does not have the specified data such as the key to descramble the scrambled data, and therefore the data recorded onto the DVD-ROM cannot be played back. Thus, with a Content Scramble System configuration, a DVD player which has not satisfied the conditions required at the time of licensing cannot play back the DVD-ROM on which digital data is recorded, and so unauthorized copying is prevented.

However, such a Content Scramble System is not necessarily a perfect system, and already descrambling methods are decoded and the decoding methods are often shared via communication means such as the Internet. Thus, once a scramble method is decoded, content is unauthorizedly played back by the unauthorized descrambling processing, and problems arise such as duplications being made and copyrights and utilization rights being infringed.

SUMMARY

The present invention takes into consideration such situations, and provides an information processing device, information recording medium and information processing method, and computer program which realizes strict content usage management, by setting scrambling processing forms with various differing forms rather than setting uniform processing for scrambling processing of the various content regarding which usage management, such as copyright management, is required, and by executing scrambling processing with a forms being set for each content or each management unit from a large number of scrambling processing forms.

A first aspect of the present invention is an information recording medium manufacturing method, comprising: a scramble rule acquiring step for acquiring a scramble rule to apply to the content to be recorded on the information recording medium; a scrambling processing step for executing the scrambling processing as to the content, according to the scramble rule acquired in the scramble rule acquiring step; and a step for recording the scrambled content generated in the scrambling processing step and the scramble rule applied to the content, onto an information recording medium.

Further, with an embodiment of the information recording medium manufacturing method according to the present invention, the scramble rule acquiring step is a step for acquiring individual scramble rules for each recording content or for each management unit, in the event of multiple content to be recorded to the information recording medium.

Further, with an embodiment of the information recording medium manufacturing method according to the present invention, the scrambling processing step is a step for performing processing to replace at least one portion of the content data to be recorded to the information recording medium; and the scramble rule includes data which points to the position to which the content data is to be replaced.

Further, with an embodiment of the information recording medium manufacturing method according to the present invention, the scrambling processing executed in the scrambling processing step is shuffling processing of shuffle elements which are set as content-comprising data; and the scramble rule is data which describes the shuffle state of the shuffle elements.

Further, with an embodiment of the information recording medium manufacturing method according to the present invention, the scrambling processing executed in the scrambling processing step is Exclusive-OR computing processing of the content-comprising data and the previously set settings value or a value calculated based on this settings value; and the scramble rule is data describing the settings value.

Further, with an embodiment of the information recording medium manufacturing method according to the present invention, the scrambling processing executed in the scrambling processing step is a rotating processing of the content-comprising data; and the scramble rule is data describing a shift amount in the rotation.

Further, an embodiment of the information recording medium manufacturing method according to the present invention further has an encrypting processing step for executing encrypting processing of the recorded content of the information recording medium, after executing the scrambling processing step, or before executing the same.

Further, with an embodiment of the information recording medium manufacturing method according to the present invention, the scrambling processing executed in the scrambling processing step is a shuffling processing of the shuffled elements which are set as content-comprising data; and the encrypting processing executed in the encrypting processing step is encrypting processing in CBC mode executed on data units the same size as that of the shuffled elements.

Further, with an embodiment of the information recording medium manufacturing method according to the present invention, the data for processing which is executed in the scrambling processing in the scrambling processing step is data which includes at least one of the following:
(1) a portion of I-picture slice encoded data included in the MPEG encoded data,
(2) a portion of the sequence header, and
(3) PID data storing the data-type information within the transport stream packet.

Further, a second aspect of the present invention is an information processing device for executing content recording processing as to the information recording medium, comprising: a scrambling processing unit for acquiring a scramble rule to be applied to the content to be recorded on the information recording medium, according to the acquired scramble rule; and a recording processing unit for recording the scrambled content generated in the scrambling processing unit, and the scramble rule applied to this content, to the information recording medium.

Further, with an embodiment of the information processing device according to the present invention, the scrambling processing unit has have a configuration for acquiring individual scramble rules for each recording content or for each management unit, in the event of multiple content to be recorded to the information recording medium, and executing scrambling processing for each content according to the acquired scramble rule.

Further, with an embodiment of the information processing device according to the present invention, the scrambling processing unit has a configuration for performing processing to replace at least one portion of the content data to be recorded to the information recording medium; and the scramble rule includes data which points to the position to which the content data is to be replaced.

Further, with an embodiment of the information processing device according to the present invention, the scrambling processing executed in the scrambling processing unit is shuffling processing of shuffle elements which are set as content-comprising data; and the scramble rule is data which describes the shuffle state of the shuffle elements.

Further, with an embodiment of the information processing device according to the present invention, the scrambling processing executed in the scrambling processing unit is Exclusive-OR computing processing of the content-comprising data and the previously set settings value or a value calculated based on this settings value; and the scramble rule is data describing the settings value.

Further, with an embodiment of the information processing device according to the present invention, the scrambling processing executed in the scrambling processing unit is a rotating processing of the content-comprising data; and the scramble rule is data describing a shift amount in the rotation.

Further, an embodiment of the information processing device according to the present invention further has an encrypting processing unit for executing encrypting processing of the recorded content of the information recording medium.

Further, with an embodiment of the information processing device according to the present invention, the scrambling processing executed in the scrambling processing unit is a shuffling processing of the shuffled elements which are set as content-comprising data; and the encrypting processing executed in the encrypting processing unit is encrypting processing in CBC mode executed on data units the same size as that of the shuffled elements.

Further, with an embodiment of the information processing device according to the present invention, the scrambling processing unit is data for scrambling processing which includes at least one of the following:
(1) a portion of I-picture slice encoded data included in the MPEG encoded data,
(2) a portion of the sequence header, and
(3) PID data storing the data-type information within the transport stream packet.

Further, a third aspect of the present invention is an information processing device for executing playback processing of the content recorded on the information recording medium, comprising: a scrambling processing unit for executing descrambling processing of the content recorded on the information recording medium; wherein the scrambling processing unit executes analyzing of the scramble rule which is the scrambling processing information corresponding to the content stored in the information recording medium, and from the results of the deciphering, executes descrambling processing to the scramble rule for each of the acquired individual content.

Further, with an embodiment of the information processing device according to the present invention, the scrambling processing unit has a configuration for acquiring individual scramble rules for each recording content or for each management unit, in the event of multiple content to be recorded to the information recording medium, and executing descrambling processing for each content according to the acquired scramble rule.

Further, with an embodiment of the information processing device according to the present invention, the scrambling processing unit has a configuration for performing processing to replace at least one portion of the content data to be recorded to the information recording medium; and acquires the position data for pointing to the position to which the acquired content data is replaced from the results of analyzing the scramble rule, and based on this position data, executes descrambling processing.

Further, with an embodiment of the information processing device according to the present invention, the descrambling processing executed with the scrambling processing unit is processing for restoring the shuffle state of the shuffle elements which are set as content-comprising data; the scramble rule is data describing the shuffle state of the shuffle elements; and the scramble processing unit executes shuffle state restoring processing of the shuffle elements based on the scramble rule.

Further, with an embodiment of the information processing device according to the present invention, the descrambling processing executed with the scrambling processing unit is Exclusive-OR computing processing of the content-comprising data and the previously set settings value or a value calculated based on this settings value; the scramble rule is data describing the settings value; and the scramble processing unit executes Exclusive-OR computing processing of the content-comprising data and the previously set settings value based on the scramble rule.

Further, with an embodiment of the information processing device according to the present invention, the descrambling processing executed with the scrambling processing unit is rotation processing for the content-comprising data; the scramble rule is data describing the shift amount in the rotation; and the scramble processing unit executes rotation restoring processing based on the shift amount, based on the scramble rule.

Further, with an embodiment of the information processing device according to the present invention, the information processing device further comprises an encrypting processing unit for executing decrypting processing of the recorded content of the information recording medium.

Further, with an embodiment of the information processing device according to the present invention, the scrambling processing executed in the scrambling processing units is shuffling processing of the shuffle elements which are set as content-comprising data; and the decrypting processing executed in the encrypting processing units is decrypting processing in CBC mode executed on data units the same size as that of the shuffled elements.

Further, with an embodiment of the information processing device according to the present invention, the scrambling processing unit is data for descrambling processing which acquires data including at least one of the following and executing processing thereof:
(1) a portion of I-picture slice encoded data included in the MPEG encoded data,
(2) a portion of the sequence header, and
(3) PID data storing the data-type information within the transport stream packet.

Further, a fourth aspect of the present invention is an information recording medium for storing recorded data as scrambled content having scrambling processing executed according to a scramble rule set for each recording content or for every management unit; and the scramble rule applied to the scrambled content.

Further, with an embodiment of the information recording medium according to the present invention, the scrambling processing is processing for replacing at least one portion of the content; and the scramble rule is a rule for recording the data showing the position of the portion of data of the content data to be replaced.

Further, with an embodiment of the information recording medium according to the present invention, the scrambled content is scrambled content generated by the shuffling processing of the shuffle element set as the content-comprising data; and the scramble rule is data describing the shuffle state of the shuffle elements.

Further, with an embodiment of the information recording medium according to the present invention, the scrambled content is scrambled content generated by Exclusive-OR computing processing of the content-comprising data and the previously set settings value or a value calculated based on this settings value; and the scramble rule is data describing the settings value.

Further, with an embodiment of the information recording medium according to the present invention, the scrambled content is scrambled content generated by rotation processing of the content-comprising data; and the scramble rule is data describing a shift amount in the rotation.

Further, with an embodiment of the information recording medium according to the present invention, the scrambled content is scrambled content generated by shuffling processing of the shuffle elements which as set as content-comprising data; and the information recording medium has the configuration to record content encrypted by the encrypting processing in CBC mode which executes with data the same size as that of the shuffled elements as a unit.

Further, with an embodiment of the information recording medium according to the present invention, having a configuration wherein the scrambled content includes as scrambling processing data at least one of the following:
(1) a portion of I-picture slice encoded data included in the MPEG encoded data,
(2) a portion of the sequence header, and
(3) PID data storing the data-type information within the transport stream packet.

Further, a fifth aspect of the present invention is an information processing method for executing content recording processing to an information recording medium, comprising: a scramble rule acquiring step for acquiring a scramble rule to apply to the content to be recorded on the information recording medium; a scrambling processing step for executing the scrambling processing as to the content, according to the scramble rule acquired in the scramble rule acquiring step; and a step for recording the scrambled content generated in the scrambling processing step and the scramble rule applied to the content, onto an information recording medium.

Further, a sixth aspect of the present invention is an information processing method for executing playback processing of the content recorded on an information recording medium, comprising: a scrambling processing step for executing descrambling processing of the content recorded on the information recording medium; wherein the scrambling processing step further comprises a scramble rule analyzing step for executing analyzing of the scramble rule which is the scrambling processing information corresponding to the content stored in the information recording medium, and a descrambling step for, based on the results of the scramble rule analyzing step, executing descrambling processing corresponding to the scramble rule for the acquired individual content.

Further, a seventh aspect of the present invention is a computer program for executing content recording processing to an information recording medium with a computer, comprising: a scramble rule acquiring step for acquiring a scramble rule to apply to the content to be recorded on the information recording medium; a scrambling processing step for executing the scrambling processing as to the content, according to the scramble rule acquired in the scramble rule acquiring step; and a step for recording the scrambled content generated in the scrambling processing step and the scramble rule applied to the content, onto an information recording medium.

Further, an eighth aspect of the present invention is a computer program for executing playback processing of the content recorded on the information recording medium with a computer, comprising: a scrambling processing step for executing descrambling processing of the content recorded on the information recording medium; wherein the scrambling processing step further comprises a scramble rule analyzing step for executing analyzing of the scramble rule which is the scrambling processing information corresponding to the content stored in the information recording medium, and a descrambling step for, based on the results of the scramble rule analyzing step, executing descrambling processing corresponding to the scramble rule for the acquired individual content.

The computer program according to the present invention is, for example, a computer program which can provide a computer system which can execute various program codes with a memory medium, communication media, recording media such as CD, FD, or MO, or a communication medium such as a network, in a computer-readable format. By providing such a program in a computer-readable format, processing according to the program can be realized with the computer system.

Further objects, features, and advantages of the present invention will become apparent through the detailed descriptions based on the below-described embodiments of the present invention or the attached diagrams thereof. In this specification, a system is considered to be the configuration of a logical collection of multiple devices, and does not limit the devices for each configuration to be housed within one unit.

Advantages

With the configuration according to the present invention, the scrambling processing forms with various differing forms are set, rather than setting uniform processing for scrambling processing of the various content as requested by the usage management system such as copyright management, and scrambling processing is executed with a form being set for each content or each management unit from a large number of scrambling processing forms, and therefore, if by chance there is an event wherein scrambling for a given content is unauthorizedly decoded and the content is leaked, the content which has a scrambling process with a different scrambling form cannot be descrambled, and so leakage of content can be kept to a minimum.

With the configuration according to the present invention, scrambling processes such as shuffling processing, EXOR processing, and rotation processing are executed, and with shuffling processing, various shuffle forms are specified as the scramble rules, and with EXOR processing, values applicable to EXOR are specified as the scramble rules, and with rotation processing, the rotation shift amounts are specified as the scramble rules. For example, in the case of using 32 shuffle elements with shuffling processing, 32! different shuffle forms, that is to say, scramble rules, can be specified. Also, with EXOR processing, the values applicable to EXOR, and with rotation processing, various values of the shift amount, can be set, and so a large number of scramble rules can be set, so a configuration is realized wherein scrambling of each content based on the rules selected from this large number of scramble rules is performed, and based on the leakage of specified scramble rules, leakage of a large amount of content can be prevented.

Additional features and advantages of the present invention are described in, and will be apparent from, the following Detailed Description and the Figures.

BRIEF DESCRIPTION OF THE FIGURES

FIG. 3 is a diagram showing corresponding examples of the content management unit configuration and a scramble rule.

FIG. 9 is a diagram describing a scramble rule in the event of executing shuffle processing as the scrambling processing.

FIG. 13 is a diagram describing a help file to be used when executing content encrypting.

FIG. 14 is a diagram showing the help file syntax to be used when executing content encrypting.

FIG. 15 is a diagram describing processing for executing a licensing entity, authoring facility, and encrypting facility in the event of executing scrambling processing with the encrypting facility.

FIG. 18 is a diagram describing the syntax of a source packet and header comprising the MPEG-2 transport stream data.

FIG. 19 is a diagram describing the syntax of a transport packet comprising the MPEG-2 transport stream data.

FIG. 20 is a diagram describing content data transition in the event of executing Exclusive-OR (EXOR) processing as the scrambling processing.

FIG. 21 is a diagram describing the scramble rule in the event of executing Exclusive-OR (EXOR) processing as the scrambling processing.

DETAILED DESCRIPTION

Hereafter, the details of an information processing device, information recording medium and information processing method, and computer program will be described with reference to the diagrams. It should be noted that the descriptions will follow the itemized list as follows.

1. Storage data and playback processing of the information recording medium
2. Details of content recording processing of the information recording medium
   (2-1) Shuffling processing
   (2-2) Exclusive-OR (EXOR) processing
   (2-3) Rotating processing
3. Configuration examples of the information processing device.

[1. Storage Data and Playback Processing of the Information Recording Medium]

Figure 1:
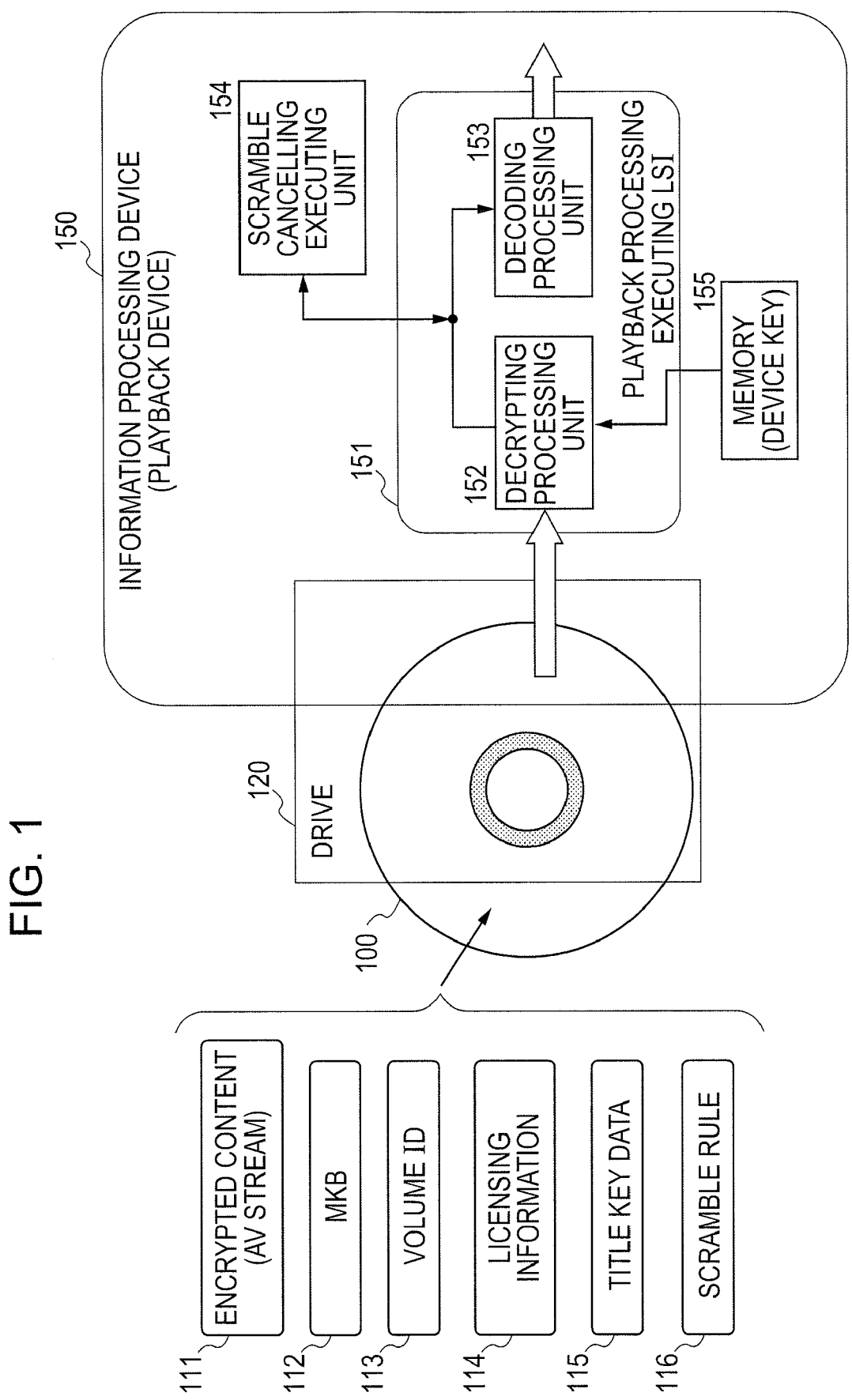
FIG. 1 is a diagram describing a storage data configuration of an information recording medium, and the configuration and processing of an information processing device which executes playback processing.

First, content playback processing with the storage data of the information recording medium and the information processing device (playback device) will be described. FIG. 1 shows a configuration of an information recording medium 100 wherein content is stored which can be processed according to the present invention, and an information processing device (playback device) 150. Here, an information storage example of a ROM disk is shown as a disk on which content is already stored. The information processing device (playback device) 150 can be various information processing devices, such as a PC for example or a device specifically for playing back, and has a drive 120 which executes data reading processing for the information recording medium 100.

The ROM disk which is the information recording medium 100 is an information recording medium such as a Blu-ray disk or DVD for example, and is an information recording medium storing legal contents which has been manufactured in a disk manufacturing plant under the authority of so-called content right-holder having legal content copyrights or distribution rights. With the embodiments below, the example of a disk-type medium is described as an example of the information recording medium, but the present invention is applicable to information recording mediums of various forms.

As shown in FIG. 1, the information recording medium 100 comprises encrypted content 111 having scrambling processing and encrypting processing performed; an MKB (Media Key Block) 112 as an encryption key block generated based on a key distribution method of a tree structure which is known as a form of a broadcast encryption method; a volume ID 113 which is set as identifying information for individual information recording mediums or for each information recording medium in a unit of a predetermined number of disks, licensing information 114 which includes CCI (Copy Control Information) as the content copy/playback control information; title key data 115 which comprises a recording seed (REC SEED) as necessary information for generating a title key to use in content decrypting processing; and further, scramble rules 116 storing information as to form of scrambling processing has been performed for each content stored in the information recording medium 100 or management unit thereof.

Now, an outline of the various types of information will be described.

(1) Encrypted Content 111

Various content is stored in the information recording medium 100. This is content such as game programs, image files, audio data, or text data in forms regulated by specified standards or AV(Audio Visual) streaming of moving image content such as HD (High Definition) movie content which is high resolution moving image data, for example. This content is specified AV format standard data, and is stored according to specified AV data formatting. Specifically, for example Blu-ray disk ROM regulation data is stored according to Blu-ray disk ROM regulation formatting. This is called the main content.

Further, game programs, image files, audio data, or text data, for example, may be stored as sub-content as extra (service) data. The sub-content is data having a data format which does not follow the specified AV data formatting. In other words, this can be stored with any formatting without following Blu-ray disk ROM regulation formatting as Blu-ray disk ROM non-standard data,. This is called the sub-content.

Types of content for both main content and sub-content include various content such as music data, moving images, image data of still images, game programs, and WEB content, and this content includes various forms of information such as content information usable only by data from the information recording medium 100, content information usable by data from the information recording medium 100 together with data provided from a server which is connected to a network. The content stored in an information recording medium is divided by content section and different keys (title keys) assigned and encrypted and stored, so as to realize usage control differing for each section of content. A unit to which one title key is assigned is called a content management unit (CPS unit).

(2) MKB

The MKB (Media Key Block) 112 is an encryption key block generated based on a key distribution method of a tree structure which is known as a form of a broadcast encryption method. MKB 111 is a key information block which is able to acquire a media key (Km) which is a key necessary for content decrypting, only by processing (decrypting) based on a device key stored in the information processing device of a user with a valid license. This key can be acquired only in the case that the user device (information processing device) has a valid license, by an information distribution method according to a so-called hierarchy tree structure, and the acquiring of a key (media key) of a user device which has been invalidated (revoking processing) can be stopped. With the changes to the key information stored in the MKB, the management center can generate a MKB with a configuration which cannot decrypt with the specified device key stored in the user device, that is to say, cannot acquire the media key necessary for content decrypting. Accordingly, unauthorized devices can be eliminated (revoked) at arbitrary timing, and thus encrypted content can be provided which can only be decrypted by devices with a valid license. The decrypting process of content will be described later.

(3) Volume ID

The volume ID is an ID which is set as identifying information for each information recording medium within a unit made up of a predetermined number of disks, or for individual information recording media. This volume ID is used as title key generating information to be used in the decrypting of the content. This processing will be described later.

(4) Licensing Information

Licensing information includes, for example, copy/playback control information (CCI). This is copy restriction information or playback restriction information for usage control corresponding to the encrypted content 111 stored in the information recording medium 100. This copy/playback control information (CCI) can have various settings, such as the case of setting information for individual CPS units which as set as content management units, or the case or setting corresponding to multiple CPS units. The details of this information will be described later.

(5) Title Key Data

As described above, each content or collection of multiple content is encrypted using individual encryption keys (title keys) for each, for content usage management, and is stored in the information recording medium 100. That is to say, it becomes necessary for the AV(Audio Visual) stream, music data, moving images, image data of still images and the like, game programs, WEB content, and so forth which comprise the content, to be divided into units of content usage management units, different title keys to be generated for each divided unit, and decrypting processing to be performed. The information for generating this title key is the title key data, and a recording seed comprising a portion of data of the content is used, for example.

Title keys corresponding to each unit are generated according to a predetermined encrypting key generating sequence using the title key data 115, and content decrypting is executed.

(6) Scramble Rule

As described above, the content stored in the information recording medium 100 has encrypting processing performed, and further has scrambling processing performed. The scrambling processing is executed with different forms for each content or content management unit (CPS unit) stored in the information recording medium 100. Accordingly, when performing content playback, the scrambling processing information performed on the content for playback is acquired, and descrambling processing must be performed corresponding to the executed scrambling processing. The scramble rule 116 is recorded data of the scramble form information for each content or content management unit (CPS unit) stored in the recording information recording medium 100. This scramble rule is recorded in the information medium as data which is decodable only in an information processing device which has a license. The data is recorded using a secure code for example, Java secure code for example, and so decoding can only be performed with secure code decoding processing within a Java virtual machine which is set in the playback device.

FIG. 1 shows an outline of the configuration of the information processing device 150 which executes playback processing of the content stored in the information recording medium 100. The information processing device has a drive 120 which executes reading processing of the stored data in the information recording medium. The data read by the drive 120 is input into a playback processing executing LSI 151 which executes decrypting processing and decoding processing (for example MPEG decoding) of the encrypted content.

The playback processing executing LSI 151 has a decrypting processing unit 152 for executing decrypting processing of the encrypting content, and a decoding processing unit 153 for executing decoding (for example MPEG decoding) processing. With the decoding processing unit 152, a title key is generated from a device key stored in the memory 155 and the reading data from the information recording medium 120, and decrypting processing of the encrypting content 111 is executed.

The decrypted content has scrambling processing executed therein. An descrambling executing unit 154 executes this descrambling. After the decrypted content has the descrambling processing executed thereupon which is determined based on the scramble rule 115, with the descrambling executing unit 154, the descrambled data is input again into the playback processing executing LSI 151, and decoding processing is executed in the decoding processing unit 153, and the data is output and played back. The details of the content decrypting and descrambling processing sequence in the information processing device 150 will be described later.

Next, the content management configuration which divides the content stored in the information recording medium and realizes usage control that differs for each divided content will be described with reference to FIG. 2 and subsequent drawings.

As described above, the content stored in an information recording medium is divided by content section, assigned different keys (title keys) for each divided content, encrypted, and further scrambled and stored, so as to realize usage control differing for each section of content. A unit to which one title key is assigned is called a content management unit (CPS unit).

Content belonging to each unit is encrypted applying the respective title keys, and at the time of content usage, a key (title key) assigned to each unit is acquired, and further descrambling corresponding to the scramble rules is executed and playback is performed. Each title key can be managed individually, and for example a title key assigned to a unit A can be set as a key which can be acquired from the information recording medium. Also, a title key assigned to unit B can be acquired under the condition that the server connected to the network is accessed and the user has executed predetermined requirements, and so acquiring keys corresponding to the various units and the management configuration thereof can be set independently for the various title keys.

A settings form of the unit to which one key is assigned, that is to say, a content management unit (CPS unit) will be described with reference to FIG. 2.

Figure 2:
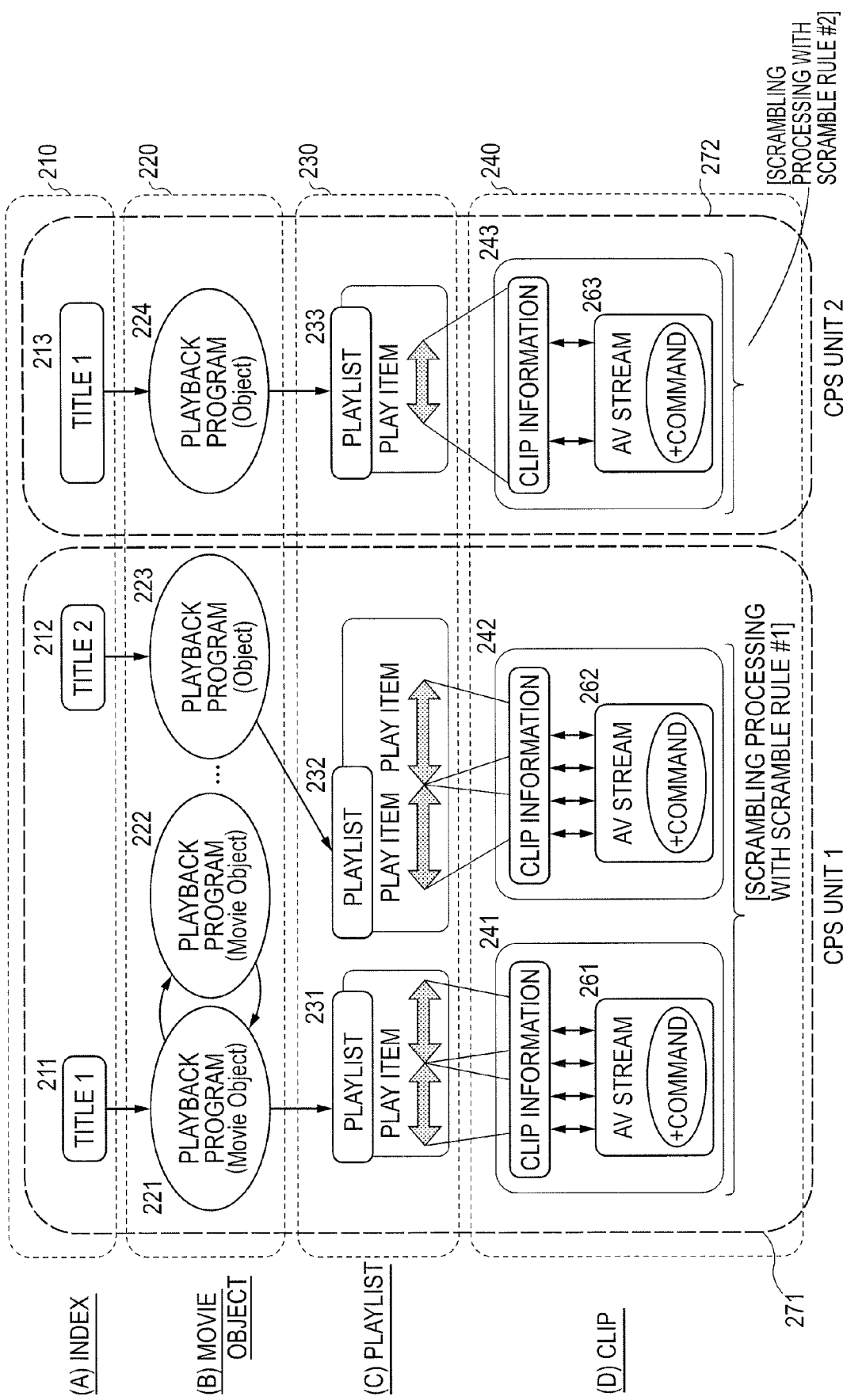
FIG. 2 is a diagram describing a settings example of a content management unit for setting the storage content of the information recording medium.

As shown in FIG. 2, the content has a hierarchical structure with (A) a title 210, (B) a movie object 220, (C) a playlist 230, and (D) a clip 240, and when the title is specified which is an index file accessed by the playback application, the playback program associated with the title is specified, a playlist is selected which has the content playback order and so forth regulated according to the program information of the specified playback program, then an AV stream or command as the content actual data is read out by the clip information which is regulated in the playlist, and playback of the AV stream or executing processing of the command is performed.

FIG. 2 shows two CPS units. These configure a portion of the content stored in the information recording medium. Each of the CPS unit 1 and 271 and CPS unit 2 and 272 are CPS units which are set as units including the title as an application index, and a movie object as a playback program file, and a playlist, and a clip which includes an AV stream file as content actual data.

The content management units (CPS units) 1 and 271 contain titles 1 and 211 and titles 2 and 212, playback programs 221 and 222, playlists 231 and 232, and clip 241 and clip 242; and the AV stream data files 261 and 262, which are the actual data of the content contained in these two clips 241 and 242, are encrypted using the title key: Ku1 which is the encryption key which is set corresponding to the content management units (CPS unit) 1 and 271.

The content management units (CPS units) 2 and 272 contain titles 3 and 213, playback program 224, playlist 233, and clip 243; and the AV stream data file 263, which is the actual data of the content contained in the clip 243, is encrypted using the title key: Ku2 which is the encryption key which is set corresponding to the content management units (CPS unit) 2 and 272.

For example, in order for the user to execute an application file or content playback process corresponding to the content management units 1 and 271, the title key: Ku1, which is the encryption key and which is set corresponding to the content management units (CPS units) 1 and 271, must be acquired, and decrypting processing must be executed, and after executing the decrypting processing, the application program can be executed and the content can be played back. In order to execute an application file or content playback process corresponding to the content management units 2 and 272, the title key: Ku2, which is the encryption key and which is set corresponding to the content management units (CPS units) 2 and 272, must be acquired, and decrypting processing must be executed.

With the scrambling processing also the same applies, and scrambling processing which differs for each content management unit is executed and stored in the information recording medium. For example, scrambling processing using scramble rule #1 is performed as to the CPS units 1 and 271, and scrambling processing using scramble rule #1 is performed as to the CPS units 2 and 272. For descrambling at the time of content playback, the descrambling process corresponding to each scramble rule must be executed. The scramble rule can also have a form such as changing with the content contained in the CPS unit.

FIG. 3 is a table showing the correlation between each content and CPS unit and scramble rule in the case that different scramble rules are used for each CPS unit. As shown in FIG. 3, the content management unit (CPS unit) corresponding to the index or application file of the application layer or data group and the scramble rules are correlated.

The information processing device 150 which executes content playback processing identifies the content management unit (CPS unit) for playing back, and from the scramble rules 116 acquires the scramble rule which is executed as to the content management unit for playing back, and descrambling processing is executed corresponding to the applicable rule, thus executing the descrambling.

With the configuration of the present invention, the scrambling processing which is used for the content stored in the information recording medium are not identical, but rather is a form wherein the scrambling processing is different for each individual content management units (CPS units) or content; and for playback processing, descrambling processing must be executed corresponding to the scramble rule applicable as to each content management unit (CPS units) or content.

Next, with reference to FIG. 4, details will be described of the content playback processing in the information processing device which acquires content from the information recording medium wherein the encrypted content, which has had encryption at the CPS unit level and scrambling processing as described above, and various key generating information and the scramble rules are stored, and which executes playback processing.

Figure 4:
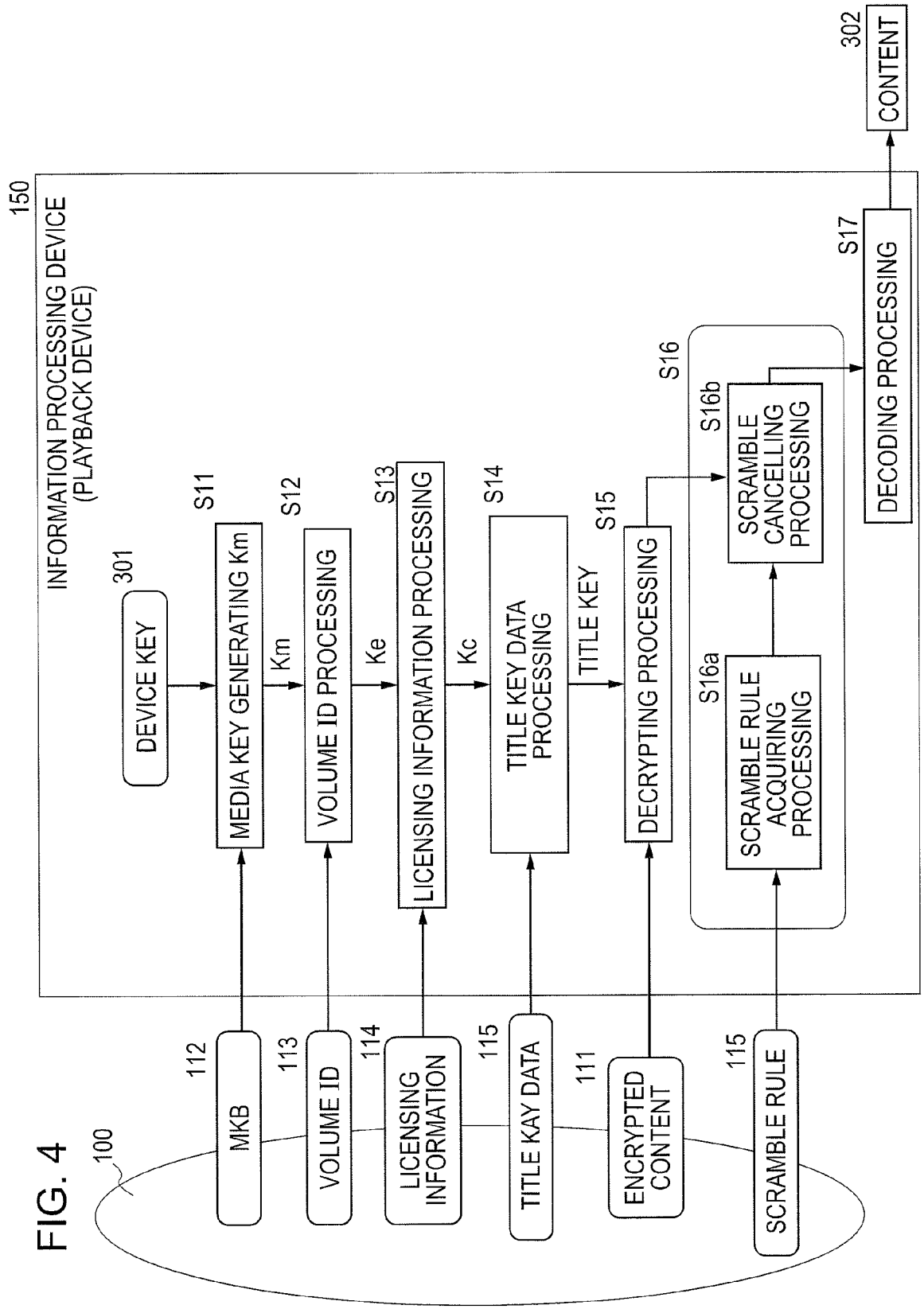
FIG. 4 is a diagram describing the content playback sequence in an information processing device which executes content playback.

As shown in FIG. 4, the content playback processing which is executed in the information processing device 150 contains the two processes which are the decrypting processing of the encrypted content and the descrambling processing.

The information processing device 150 reads the various information from the information recording medium 100, and decrypting processing of the encrypted content is executed based on the title key generated by the key generating processing which uses readout data and the device key 301 kept by the information processing device 150, and further, descrambling processing of the decrypted content is executed. With this embodiment, an example is shown wherein descrambling is performed after the decrypting processing of the content, but there can be a configuration for performing decrypting processing after the descrambling processing, and this processing sequence is dependent on the recording processing sequence of the content stored in the information recording medium.

The detailed sequences of the decrypting process and the descrambling process of the encrypted content in the information processing device 150 will be described with reference to FIG. 4. With the content decrypting process, first, the information processing device 150 reads out the device key 301 stored in the memory. The device key 301 is a secret key stored in the information processing device which has received a license related to use of the content.

Next, in step S11, the information processing device 150 executes decrypting processing of the MKB 112 which is the encryption key block wherein is stored the media key Km stored in the information recording medium 100, using the device key 301, and acquires the media key Km.

Next, in step S12 a title generating key Ke (embedded Key) is generated by the encrypting processing based on the media key Km acquired in the MKB processing in step S11, and the volume ID 113 read out from the information recording medium 100. This key generating process is executed as processing according to for example an AES encryption algorithm.

The details of the AES encryption algorithm will be described with reference to FIG. 5. An example of a process according to the AES encryption algorithm is applying an AES-based hash function [AES_H]. The AES-based hash function is configured by a combination of the Key Generation processing executing unit (AES_G) accompanying the data decrypting processing using the AES encryption processing, and EXOR unit. The AES_G portion is configured of the combination of the AES decryption unit (AES_D) and the EXOR unit, as FIG. 5 further shows.

Figure 5:
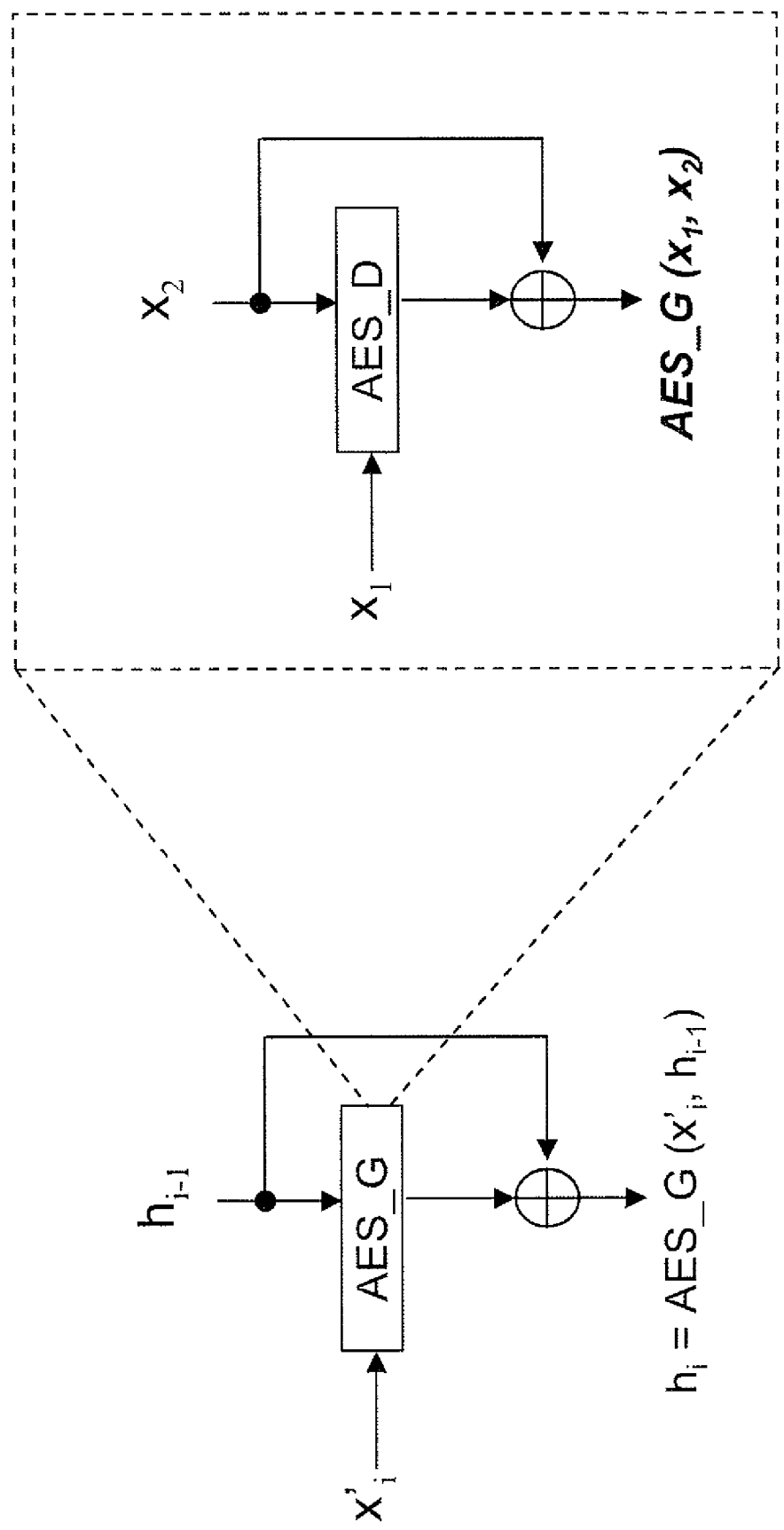
FIG. 5 is a diagram describing details of encrypting processing such as key generating which is used for content playback in the information processing device.

The generating process for the title key generating key Ke (embedded Key) in step S12 in FIG. 4 takes as input the media key Km acquired in the MKB process in step S11 and the volume ID 113 read out from the information recording medium 100, and executes the hash function of the AES base [AES_H] shown in FIG. 5 for example.

Next, in step S13, a control key Kc is generated by the encryption processing (AES_H) based on the title key generating key Ke (embedded Key) and the licensing information 114 read out from the information recording medium 100, and in step S14, the title key is generated by the encryption processing (AES_H) based on the control key Kc and the title key data 115 which is read out from the information recording medium 100.

Next, in step S15, decrypting processing (for example AES_D) using the title key is executed as to the encrypted content read out from the information recording medium 100.

Next, in step S16, descrambling processing of the decrypted content is executed. The descrambling process of the step S16 comprises a scramble rule acquiring process in step S16a and a descrambling process in step S16b.

As described above, the content has scrambling processing performed thereto with the applicable scramble rule which differs for each content management unit or each content, and is stored in the information recording medium 100. The scramble rule acquiring process in step S16a is processing which acquires the scramble rule 115 stored in the information recording medium 100 and deciphers the scramble rule corresponding to the content for playback. The descrambling processing in step S16b executes the descrambling process which corresponds to the scramble rule deciphered in step S16a.

The scramble rule acquiring step in S16a and the descrambling process in step S16b must be executed as secure data processing so that the scramble rule does not leak. The scramble rule 115 stored in the information recording medium is determined with a secure Java code, and the information processing device 150 executes the scramble rule acquiring process in step S16a and the descrambling process in step S16b as the processing within the Java virtual machine which Java realizes.

After this, decoding processing such as MPEG decoding, for example, is executed in step S17 to the content data after the descrambling, and the content 302 is output.

Figure 6:
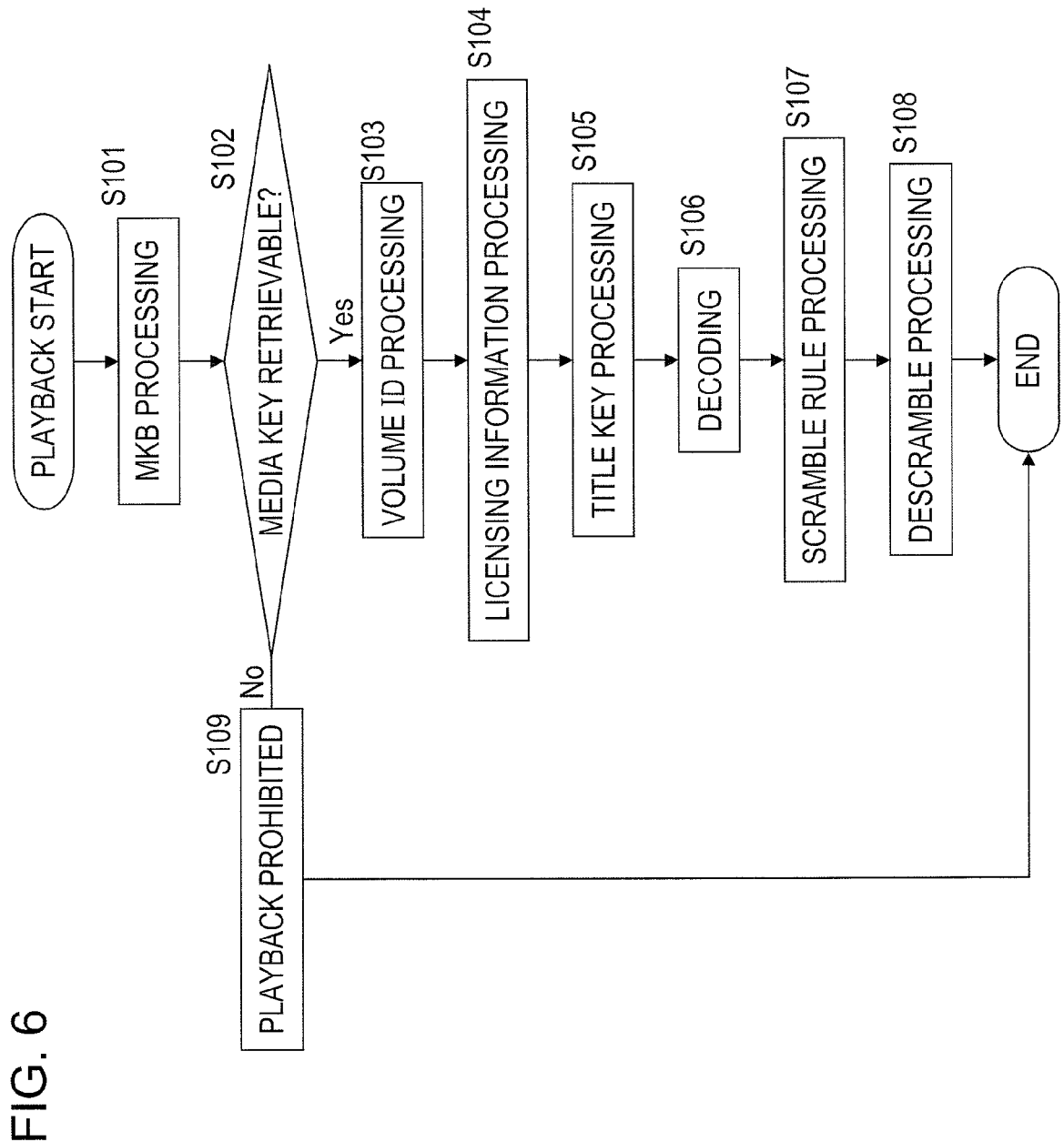
FIG. 6 is a flowchart describing content playback order in an information processing device which executes content playback.

The content playback sequence which is executed by the information processing device 150 will be described with reference to the flowchart shown in FIG. 6. In step S101, the decrypting processing of the MKB 112 stored in the information recording medium 100 is executed with the applicable device key, and the media key Km acquiring processing is executed. In step S102, in the event that the acquiring of the media key is determined to be a success, the flow continues to step S103.

In Step S102, in the case that the acquiring of the media key is determined to be a failure, the flow continues to step S109, playback is prohibited, and the process ends. The case in which the acquiring of the media key fails refers to the state in which the device key maintained by the information processing device is revoked, that is to say the license is not recognized. As described above, the MKB can be configured to be updated as necessary, and the media key is able to be acquired only when the storage device key is used in an information processing device which maintains a valid license, and in the case it is revoked, the media key cannot be acquired.

In the case that the acquiring of the media key succeeds, the flow proceeds to step S103, and the title key generating key Ke (embedded Key) is generated by the encrypting process based on the acquired media key Km and the volume ID 113 read out from the information recording medium 100. This key generating process is executed as a process using an AES-based hash function [AES_H] as shown in FIG. 5 for example, as described above.

Next, in step S104, the control key Kc is generated by the encryption process (AES_H) based on the title key generating key Ke (embedded Key) and the license information 114 read out from the information recording medium 100, and in step S105, the title key is generated by the encryption process (AES_H) based on the control key Kc and the title key data 115 read out from the information recording medium 100.

Next, in step S106, decrypting processing (for example AES_D) using the title key is executed as to the encrypted content read out from the information recording medium 100, and in step S107, the scramble rule 115 stored in the information recording medium 100 is acquired, and the processing for deciphering the scramble rule corresponding to the content to be played back is executed, and in step S108, the descrambling processing corresponding to the descrambled rule is executed.

[2. Details of Content Recording Processing of the Information Recording Medium]

Next, the details of the content recording process as to the information recording medium will be described. The manufacturing sequence of the content storage information recording medium will be described, with reference to FIG. 7.

Figure 7:
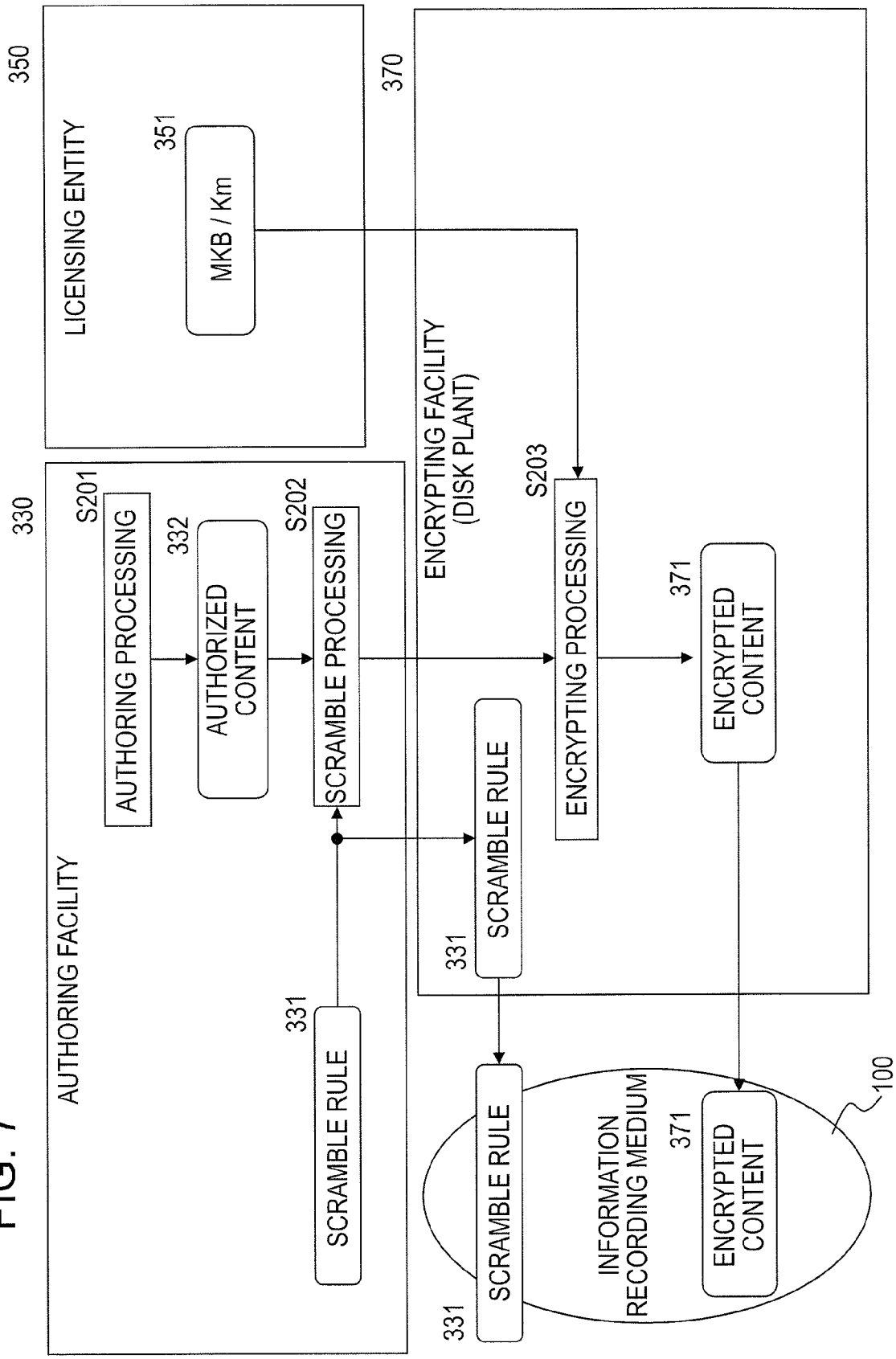
FIG. 7 is a diagram describing processing for executing a licensing entity, authoring facility, and encrypting facility.

As shown in FIG. 7, first, for the content stored in the information recording medium, editing processing in an authoring facility 330 which executes content editing processing, that is to say, authorizing processing is executed in step S201, and the authorized content 332 is generated. The authoring content is normally set as content which has been encoded with an MPEG encoding or the like.

Further, an applicable scramble rule 331 is selected, and based on the selected scramble rule, scrambling processing is executed in step S202. It should be noted that there are various forms of the scrambling forms. These specific forms will be described later. In Step S202, after the scrambling processing is performed, the scrambled content is transferred to the encryption facility 370 which serves as a disk plant for executing information recording medium manufacturing processing.

With the encryption facility 370, in step S203, encryption processing is executed as to the scrambled content. A licensed entity 350 executes the management of the MKB which is an encryption key block as described above, and provides the media key Km to the encryption facility 370 which executes content encryption processing, and the encryption facility 370 executes processing using the media key, and executes content encryption. The details of the encryption process will be described later.

The encrypted content 371 which is generated by the encryption processing in step S203 and the scramble rule 331 used in the authoring facility 330 are written in to the information recording medium 100 with the encryption facility 370, and the information recording medium 100 is manufactured.

As examples of the scrambling processing, the three types of scrambling processing below will be described in order.
 (2-1) Shuffling processing
 (2-2) Exclusive-OR (EXOR) processing
 (2-3) Rotation processing
 [(2-1) Shuffling Processing]

Figure 8:
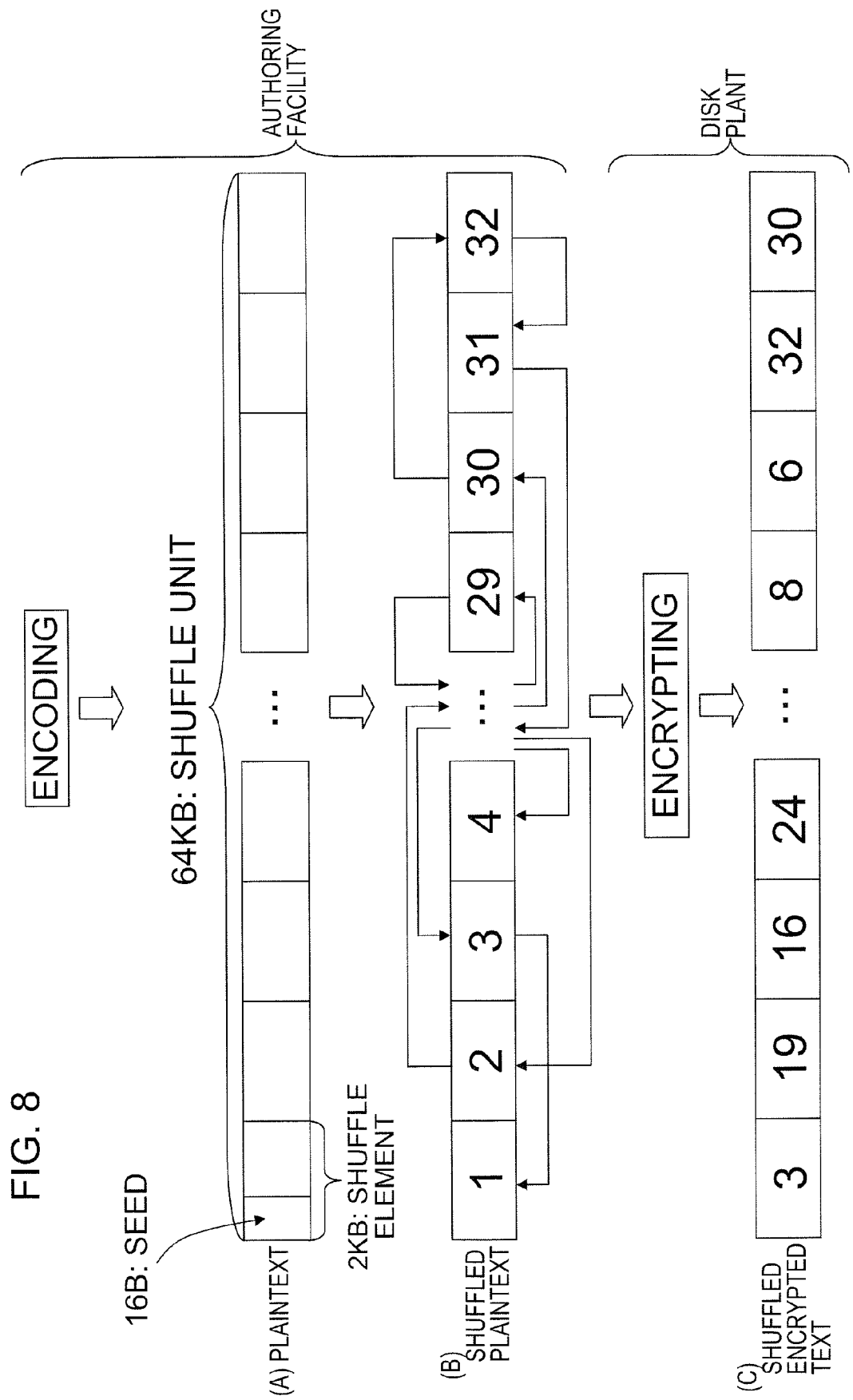
FIG. 8 is a diagram describing content data transition in the event of executing shuffle processing as the scrambling processing.

FIG. 8 is a diagram showing the generating processing of the recorded data described in FIG. 7 as modified content data, and shows a processing example in the case of using shuffling processing as the applicable scrambling processing. In the case of using shuffling processing as the scrambling processing, various different shuffle forms can be set for each scramble rule. That is to say, a large number of shuffle forms can be set as follows:

Scramble rule #1: Shuffle form 1
Scramble rule #2: Shuffle form 2
Scramble rule #3: Shuffle form 3
Scramble rule #n: Shuffle form n and one of the scramble rules #x (shuffle form x) is used for each content or each content management unit (CPS unit), and scrambling processing is thus executed.

FIG. 8 shows, from the top layer, (A) plaintext before shuffling processing, plaintext after shuffling processing, and (C) shuffled encrypted text. As shown in FIG. 8(A), the content which is encoded with MPEG encoding or the like, that is to say, the content such as an AV stream recorded onto the information recording medium, is divided from the head into 64 KB each, and is set with a shuffle unit for every 64 KB. The 64 KB shuffle units comprise thirty-two 2 KB shuffle elements.

The shuffling processing as the scrambling processing is executed as interchange (shuffling) of the 2 KB shuffle elements. The shuffle form as an interchange form is the scramble rule. The scramble rule (shuffle form) will be described with reference to FIG. 9. FIG. 9(A) shows an example of one scramble rule (shuffle form).

The scramble rule (shuffle form) shown in FIG. 9(A) shows the reordering (reordered positions) by shuffling the 2 KB shuffle elements 1 through 32 shown in FIG. 8. In other words with this shuffle rule, after shuffling, the third shuffle element before shuffling is set as the first shuffle element, and the nineteenth shuffle element before shuffling is set as the second shuffle element, and thereafter similarly, the shuffling processing reorders the shuffle elements as 16, 24, 26 . . .

FIG. 9(B1) is the set sequence of the 2 KB shuffle elements 1 through 32 before shuffling, and (B2) is the set sequence of the 2 KB shuffle elements 1 through 32 after shuffling which is generated by the scrambling processing used in the scramble rule (shuffle form) in (A).

As described above, the scramble rule (shuffle form) can be set as different rules for each content or content management unit (CPS unit). In the event that multiple content or content management units (CPS units) are recorded on the information recording medium, the scramble rules which are used corresponding to each content or content management unit (CPS unit), that is to say, for example the scramble rules shown in FIG. 9(A) are each recorded as the scramble rule 116 described with reference to FIG. 1. The information processing device which executes the playback processing reads out the scramble rules corresponding to the content to be played back, and executes descrambling processing.

The example shown in FIG. 8 and FIG. 9 is an example wherein shuffling using 32 shuffle units is executed as the scrambling processing. In this event, there are 32! types of settings of shuffle forms, and so 32! rules can be set as the scramble rules. Scrambling processing can be executed by applying one of these 32! rules to each content or content management unit (CPS unit). Accordingly, even in the event that a scramble rule set for one content is leaked, the probability that the scramble rules used for the other contents being the same scramble rule is extremely small, and so descrambling the other content based on the leaked scramble rule is almost impossible, and thus can prevent unauthorized acquiring and use of the content.

The scramble rule 116 which is recorded on the information recording medium is described in encrypted data, for example Java secure code, and is set as data readable only by an information processing device holding a valid license, and so unauthorized rule decoding and reading is prevented.

The scrambling processing (shuffling processing) can be set to execute for all of the multiple 64 KB shuffle units which are set by dividing the content, but can also be set to execute scrambling (shuffling) processing for only a portion of the units which is selected from the multiple 64 KB shuffle units which are set by dividing the content.

The above-described example is shown with the shuffle unit being set as 64 KB, but the data size is not limited to this. However, by having the shuffle unit size the same size as the size of the ECC block which is set as a data readout unit of the drive in the content playback processing in the information processing device, which is 64 KB, the shuffled units can be read by taking one data reading. Accordingly, by setting the shuffle units to 64 KB, the deshuffle processing and the data acquiring processing which is executed in the drive at the time of playback processing can be executed as one set of processing, and efficient processing can be realized. Also, as will be described later with reference to FIG. 17, a transport packet which uses a 192 byte unit as a logical unit is used for recording, and thus processing can be performed with this unit, and further only one portion of this transport packet can have the shuffling processing performed. Also, dummy data can be inserted, and reordered with the scramble rule shown in FIG. 9 such that the dummy data is removed.

Also, the size=2 KB of the shuffle elements is the same size as the user sector data of a Blu-ray disk. With an Aligned Unit which is set with a 6 KB unit, only the first 16 bytes are set as un-encrypted data (plaintext), as shown in FIG. 8. At the head of each Aligned Unit (6 KB), a time stamp is set as the playback processing timing information.

With the content encryption processing to be described later, in the case of executing encryption processing with 6 KB units, by executing a shuffle with 2 KB units, it is more likely for time stamp information to be included in either the second or third user sector data of each Aligned Unit (6 KB), but this information is to be encrypted. Thus, by encrypting much of the time stamp information, acquiring the playback sequence based on the time stamp information is impossible unless correct decrypting processing and unscrambling processing is not executed.

As shown in FIG. 8(A) and (B), for example the scrambling processing (shuffling processing) using the scramble rule shown in FIG. 9 is executed in an authoring facility, and the shuffled data is transferred to a disk plant as an encryption facility and encryption processing is executed, and the shuffled encrypted text shown in FIG. 8(C) is generated.

As a form of the encryption processing, for example, there is a setting using a 6 KB Aligned Unit (6 KB) as the encryption processing unit and a setting using a 2 KB user sector data as the encryption processing unit, and each of these encryption processing forms will be described below.

Figure 10:
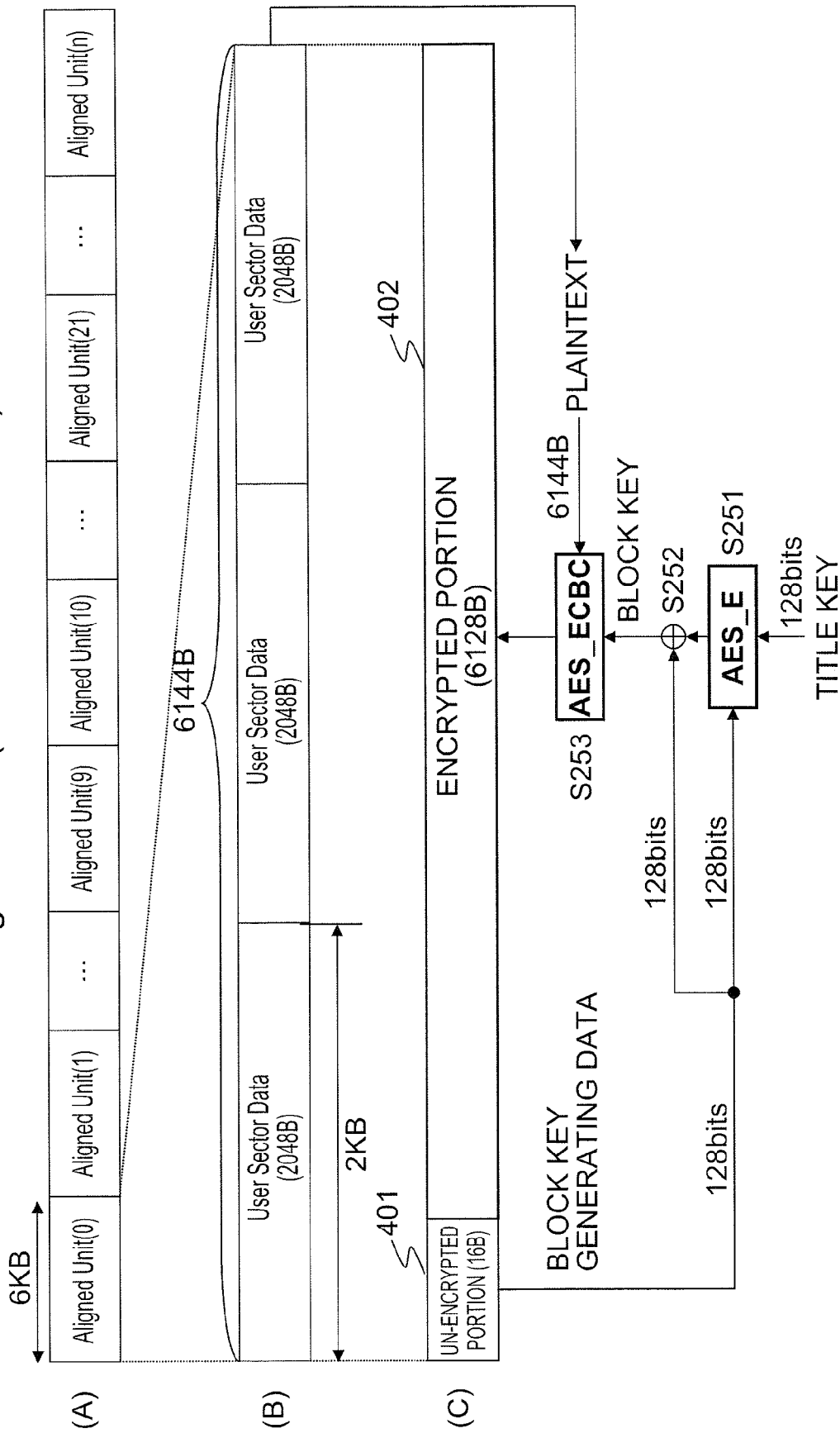
FIG. 10 is a diagram describing the details of encrypting processing in the event that content encrypting is executed with a 6 KB Aligned Unit as a unit.

First, the encryption processing using the setting using a 6 KB Aligned Unit (6 KB) as the encryption processing unit will be described with reference to FIG. 10.

FIG. 10(A) shows a data configuration the shuffled plaintext set as a 6 KB unit Aligned Unit. Each 6 KB Aligned Unit is set as a group of three 2 KB user sector data, as shown in FIG. 10(B).

The encryption processing is executed using AES_ECBC, that is to say, a CBC (Cipher Block Chaining) mode of AES encryption, with the 6 KB Aligned unit, which is formed of three 2 KB user sector data, as a processing unit. The key to use for encryption processing is the block key (128 bits) generated by the AES key generating processing from the placement EXOR and AES encryption based on the above-described title key (128 bits), and the block key generating data acquired from the first 16B un-encrypted portion 401 of the 6 KB Aligned Units. The block key is generated using the block key generating data acquired from the first 16B un-encrypted portion 401 of the 6 KB Aligned Units, and so a different key is set for each 6 KB Aligned Unit.

Figure 11:
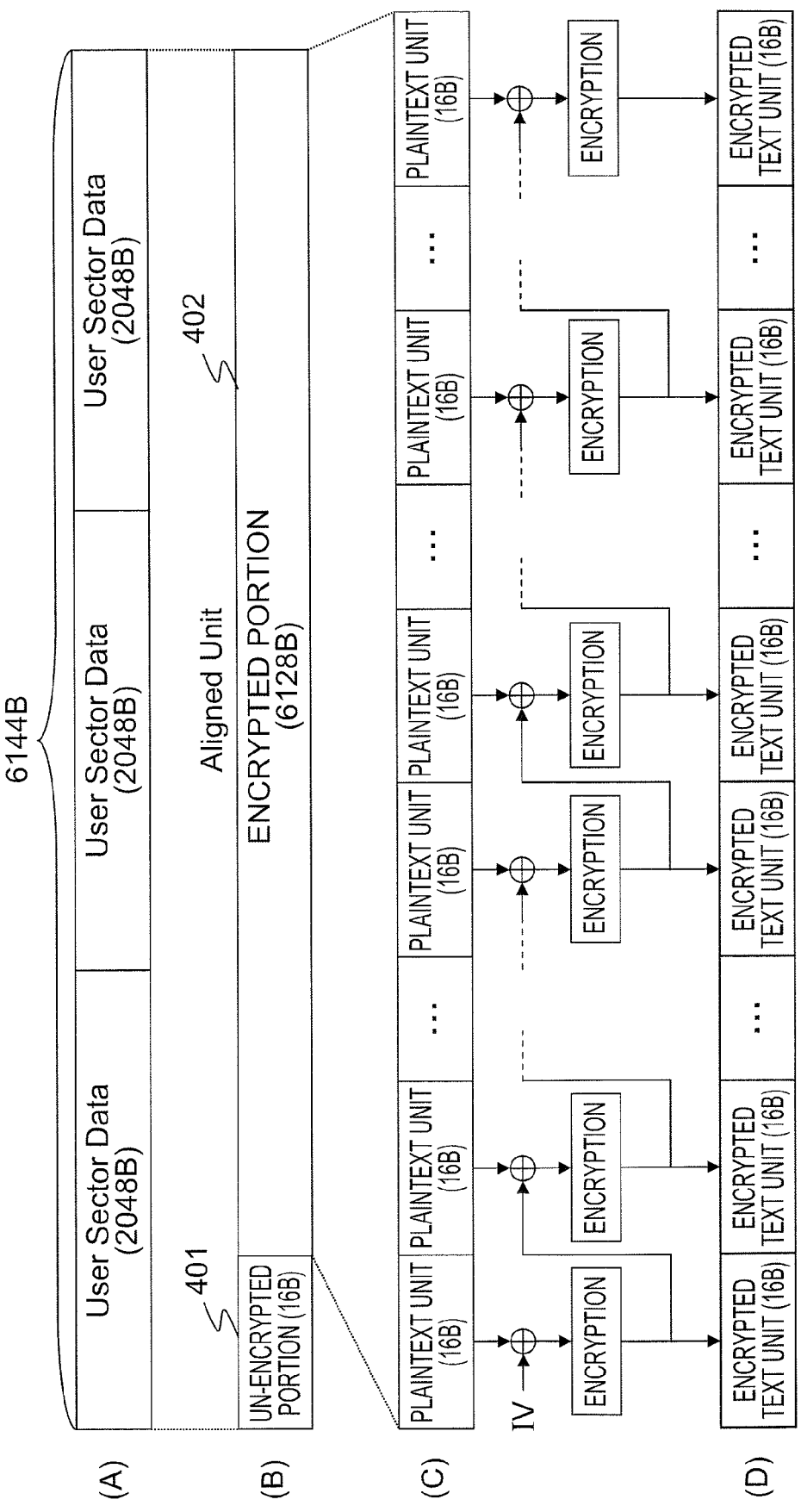
FIG. 11 is a diagram describing the details of encrypting processing using AES_ECBC mode.

The encryption processing in AES_ECBC mode will be described with reference to FIG. 11. FIG. 11(A) shows 6 KB aligned units formed from three 2 KB user sector data, similar to that in FIG. 10(B), and FIG. 11(B) shows the 16B un-encrypted portion 401 and the other encrypted portion 402.

The encrypted portion 402 is divided into plaintext units of 16B each, as shown in FIG. 11(C). The first 16 byte plaintext unit is EXORed with an initial value (IV), and further is AES-encrypted and output, and 16-byte encrypted text is set. Further, this 16-byte encrypted text is EXORed with the next 16 byte plaintext unit and AES-encrypted, and a 16-byte encrypted text unit is generated. Further, this 16-byte encrypted text is EXORed with the next 16-byte plaintext unit. Thereafter the same processing is repeated, and the encrypted text unit arrangement shown in FIG. 11(D) is generated. The key in the case of AES encryption uses the block key described with FIG. 10. Also, the initial value (IV) uses a predetermined 128-bit value which is shared between the encryption facility and the playback device.

Thus, the encrypted data of one 6 KB Aligned Unit formed with the 16B un-encrypted portion 401 and the other 6128B encrypted portion 402 shown in FIG. 10(C) is generated.

Figure 12:
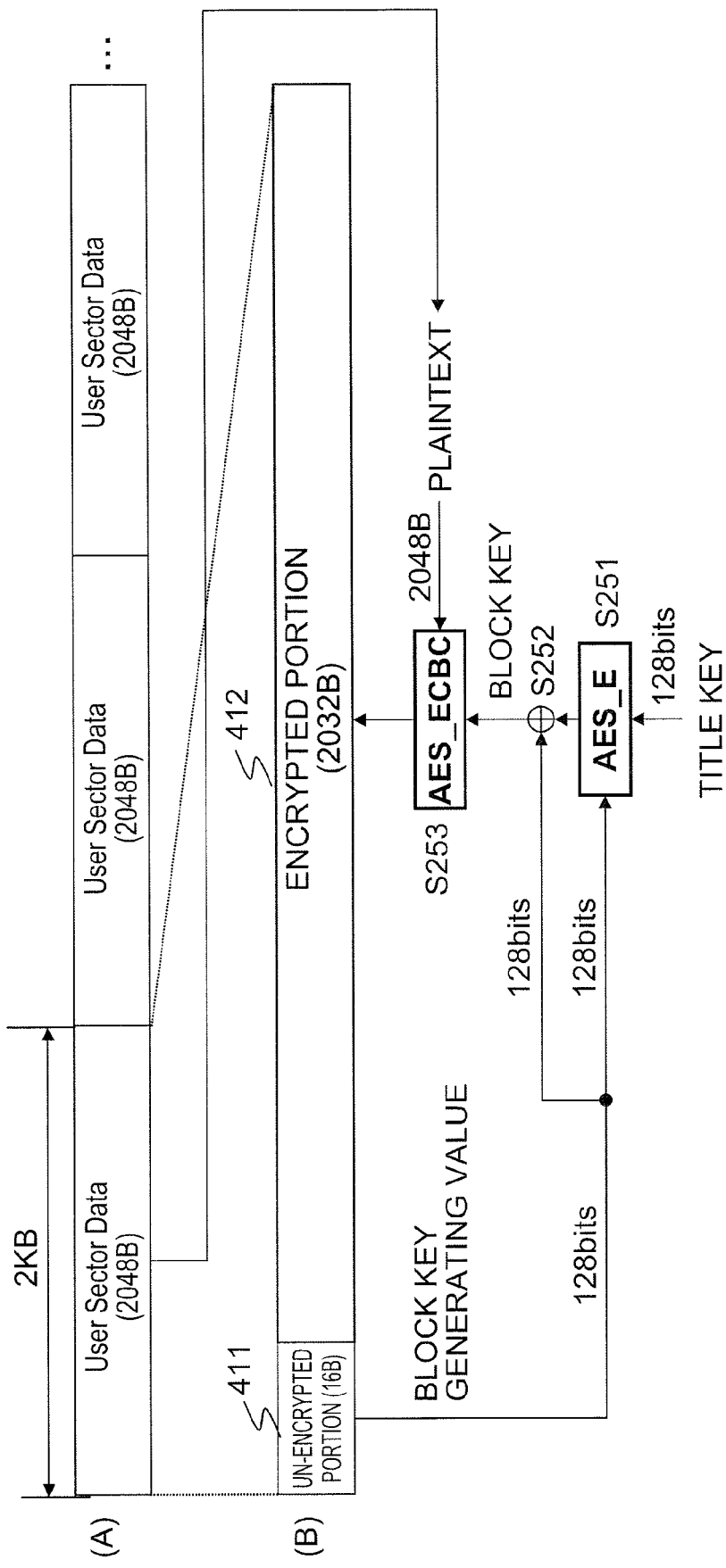
FIG. 12 is a diagram describing the details of encrypting processing in the event that content encrypting is executed with 2 KB User Sector Data as a unit.

Next, encryption processing with a 2 KB user sector data set as the encryption processing unit will be described with reference to FIG. 12. FIG. 12(A) shows a setting with the shuffled plaintext as 2 KB user sector data.

Encryption processing is executed using AES_ECBC, that is to say, a CBC (Cipher Block Chaining) mode of AES encryption, with one 2 KB user sector data as a processing unit, as described with reference to FIG. 11. The key to use for encryption processing is the block key (128 bits) generated by the AES key generating processing from the placement EXOR and AES encryption based on the above-described title key (128 bits), and the block key generating data (128 bits) acquired from the first 16B un-encrypted portion 411 of the 2 KB user sector data. The block key is generated using the block key generating data acquired from the first 16B un-encrypted portion 411 of the 2 KB user sector data, and so a different key is set for each 2 KB user sector data.

The encryption processing in AES_ECBC mode is as described with reference to FIG. 11, and as a result of the encryption processing, the encryption data of the 2 KB user sector data formed from the 16B un-encrypted portion 411 and the other 2032B encrypted portion 412 shown in FIG. 12(B) is generated.

In the case of executing the encryption processing with 2 KB user sector data units as described with reference to FIG. 12, the chain in CBC mode is in a configuration which is completed for every 2 KB. First, the shuffle elements are set to 2 KB as described with reference to FIG. 8 and so forth. Accordingly, the chain relationship in AES_ECBC mode is completed for every shuffle element. Accordingly, with the configuration performing 2 KB unit encryption, the results obtained from changing the processing order of the scrambling processing (shuffling processing) and the encryption processing are the same, and so there is the advantage of being able arbitrarily set the process order of the scramble process and the encryption process. This advantage is the same for both data recording processing and data playback processing.

Data configuration of a help file (MSTBL.DAT) to use in the encryption facility such as the disk plant and so forth which executes the encryption processing for deciding the process form of the encryption process in the event of data recording is shown in FIG. 13, and the syntax of this help file is shown in FIG. 14.

The help file is set so that the type of recording data and position information is described from [UD_START_Location] through [MKB_Location], and after this, encryption processing for each sector is executed based on the flag [Encryption_Flag]. As for the data type for each Aligned Unit, differentiation between first through third sectors, and data other than AV stream data, such as Java code for example, can be distinguished, and changing the encryption processing forms based on these data types can be performed also.

The various data has the following definitions, as shown in FIG. 14.

UD_START_Location: Physical Sector Number of start location of User Data for each Layer (Data Zone).

UD_END_Location: Physical Sector Number of end location of User Data for each Layer (Data Zone).

CHT_Location: Physical Sector Number of CHT start location.

CHT_Offset: Start location of CHT and number of bytes until directly before Hash Value (Data to be filled in by Mastering Facility).

Content_Cert_Location: Physical Sector Number of Content Certificate start location.

Content_Cert_Offset: Start location of Content Certificate and number of bytes until directly before Content ID (Data to be filled in by Mastering Facility).

UK_Inf_Location: Physical Sector Number of title key file start location. In the event that no Unit_Key.inf is stored in that Layer, specify 0000000016.

UK_Inf_Offset: Start location of Unit_Key.inf and number of bytes until directly before Encrypted Unit Key for CPS Unit #1. In the event that no Unit_Key.inf is stored in that Layer, specify 0000000016.

Num_of_UK: Number of Unit Keys of entire Disc (=number of CPS Units).

MKB_Location: Physical Sector Number OF MKB start location.

In the event that no MKB_Cert is stored in the Layer, specify 0000000016.

N: Logical Sector NUMBER OF Layer i.

Encryption_Flag: Flag for whether or not to encrypt.

Data_Type: Flag showing Type of Sector.

CPS_Unit_No: CPS Unit Number.

Clip_AV_File_No: Clip file number. Information to be used for the purpose of CHT creation.

Last_Sector_of_Clip: Flag showing last Sector of each clip (regardless of Layer).

Last_Sector_of_Layer: Flag showing last Sector of each clip in each Layer.

With the example described earlier with reference to FIG. 7 and thereafter, a processing example whereby the authoring facility executes the scrambling process has been described, but next, an example whereby the disk plant (encryption facility) executes the two processes of scrambling processing and encryption processing will be described with reference to FIG. 15.

As shown in FIG. 15, first, editing processing in the authoring facility 430 which executes the content editing processing, that is to way, the authoring process in step S271 is executed as to the content stored in the information recording medium, and the authored content 332 is generated. The authoring content is normally set as content which has been encoded with MPEG encoding or the like.

The authoring content does not execute the scrambling processing, but transfers this to the encryption facility (disk plant) 470. The encryption facility (disk plant) 470 selects the applicable scramble rule 451, and executes scrambling processing in step S272 based on the selected scramble rule. After scrambling processing is performed in step S272, encryption processing for the scrambled content is executed in step S273. The license entity 450 executes the administration of the MKB which is the above-described encryption key block, the media key Km is provided to the encryption facility 470 which executes the content encryption processing, the encryption facility 470 executes processing using the media key and generates the title key, and according to the methods described earlier with reference to FIG. 10 and FIG. 12, generates the block key and executes content encryption processing.

The encryption content 452 and the scramble rule 451, which are generated by the encryption processing in step S273, are written into the information recording medium 100 with the encryption facility 470, and the information recording medium 100 is manufactured.

Figure 16:
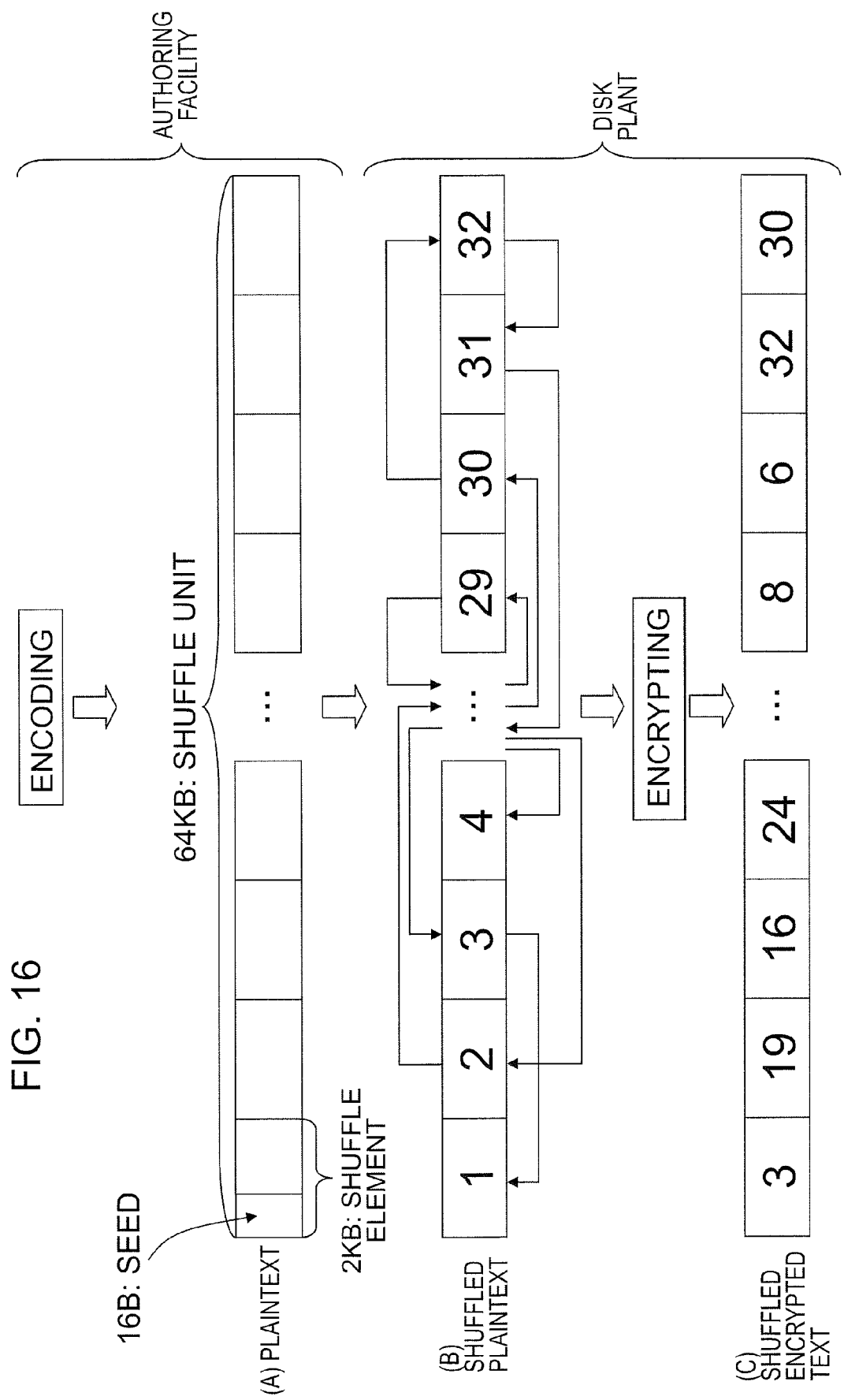
FIG. 16 is a diagram describing content data transition in the event of executing shuffle processing as the scrambling processing in the event of executing scrambling processing with the encrypting facility.

FIG. 16 is a diagram showing the generating processing of the recorded data described in FIG. 15 as changes to the content data, and shows a processing example in the case of using shuffle processing as the scrambling process. From the top layer, the diagram shows (A) plaintext before shuffling processing, (B) plaintext after shuffling processing, and (C) shuffled encrypted text. FIG. 15(A) is the data to be generated by the authoring facility, and is the content encoded by MPEG encoding or the like, that is to say, the content such as an AV stream or the like which is recorded on the information recording medium.

FIG. 15(B) shows plaintext after the shuffling process. The content is divided into 64 KB each from the front, and is set as shuffle units for every 64 KB, and shuffling is executed for thirty-two 2 KB shuffle elements. After this, encryption processing is executed, and the shuffled encrypted text shown in FIG. 15(C) is generated. According to the present processing example, the disk plant, which is the encryption facility, executes the data generating in FIG. 15(B) and (C).

The encryption processing can have the same settings as described earlier with reference to FIG. 10 through FIG. 12, that is to say, there is a setting using a 6 KB Aligned Unit as the encryption processing unit and a setting using a 2 KB user sector data as the encryption processing unit. With the setting using a 2 KB user sector data as the encryption processing unit, the scrambling process and the encryption process can be reversed as to one another and the result thereof will be the same, and so processing can be performed in any arbitrary order.

As described with reference to FIG. 7 and thereafter, the information recording medium manufacturing process of the present invention executes the scramble rule selection processing for selecting the scramble rule to apply to the content to be recorded to the information recording medium, and the scrambling processing which executes scrambling processing according to the selected scramble rule, and the processing for recording the generated scrambled content and the scramble rules selected for and applied to the content. With the scramble rule selecting process, processing is executed for selecting individual scramble rules for each recording content or each management unit in the event that there are multiple contents to be recorded to the information recording medium.

Also, for the scramble processing, there are EXOR processing, rotation processing, and so forth, besides the shuffling processing of shuffle elements which are set as content-comprising data as described above. These processes will be described below.

[(2-2) Exclusive-OR (EXOR) Processing]

Next, a processing example using exclusive-OR (EXOR) processing as scrambling processing will be described. First, before the description of this processing example, the encoded data of an AV stream recorded onto the information recording medium, that is to say, the data configuration of an MPEG 2 transport stream data, will be described.

Figure 17:
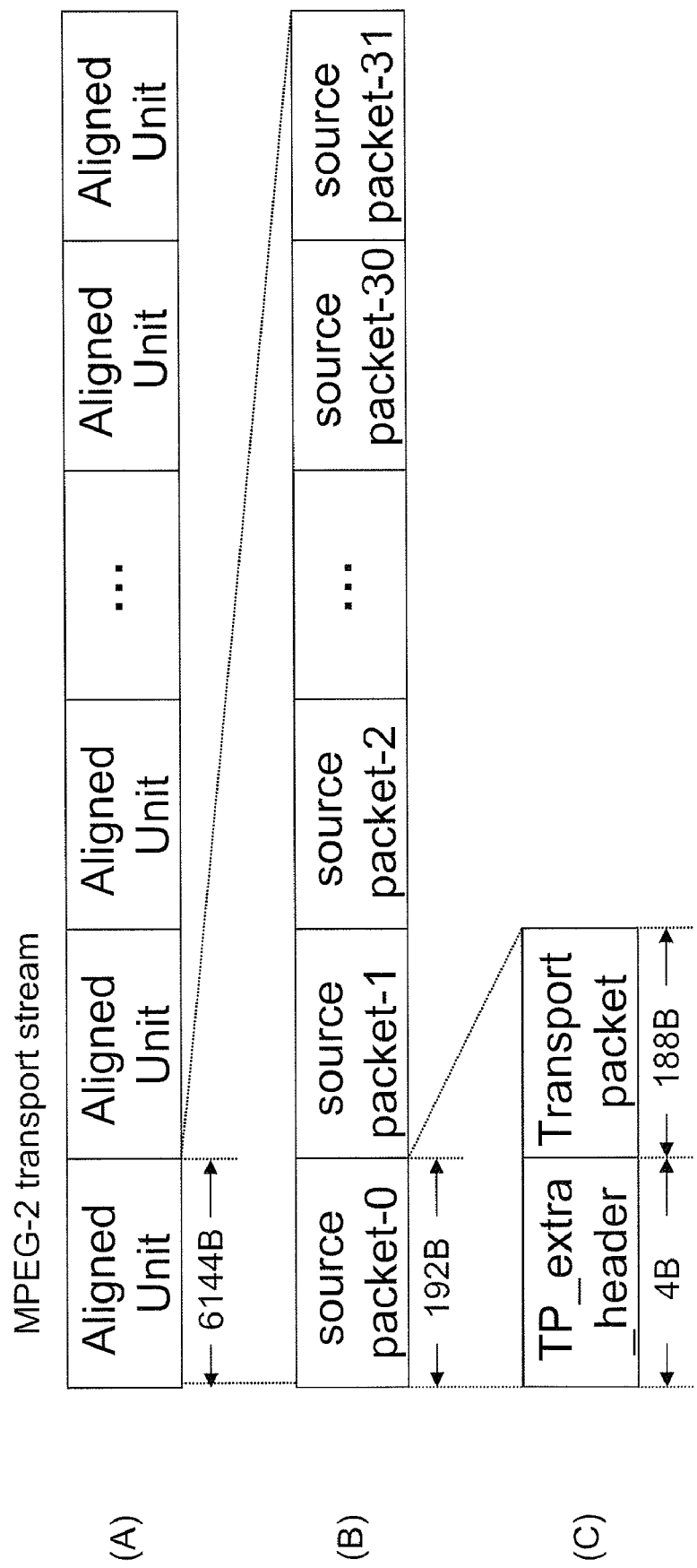
FIG. 17 is a diagram describing the configuration of MPEG-2 transport stream data.

FIG. 17 is a diagram showing the data configuration of an MPEG 2 transport stream data. The MPEG 2 transport stream data is set as linked data of the 6 KB Aligned Units as shown in FIG. 17(A). Each of the 6 KB Aligned Units comprise thirty-two 192-bit source packets, as shown in FIG. 17(B). The thirty-two 192-bit source packets equate to three 2 KB user sector data.

Each of the 192-bit source packets comprise a 4-bit TP_extra header and a 188-bit transport packet as shown in FIG. 17(C). FIG. 18(A) shows the syntax of the source packet, FIG. 18(B) shows the syntax of the TP_extra header, and FIG. 19 shows the transport packet syntax.

The processing used for applying EXOR processing as the scrambling processing is executed as processing which EXORs a predetermined n-bit (32-bit) value with n-bit data (for example 32-bit) in a predetermined position on the transport stream data of the plaintext. The predetermined n-bit (32-bit) value is the value regulated by the scramble rule.

The transition of the content (MPEG 2 stream data) in the case of executing scrambling processing (EXOR processing) with an authoring facility will be described with reference to FIG. 20.

FIG. 20(A) shows data making up an MPEG 2 transport stream. With the authoring facility, the value (32-bit value Vi) which is determined based on the scramble rule is acquired, and processing to EXOR the n-bit (32-bit) value acquired from the scramble rule is executed at the position of configuration data in the predetermined MPEG 2 transport stream, and the EXOR-completed plaintext in FIG. 20(B) is generated.

The scramble rule is for example set as the rule shown in FIG. 21. The 32-bit data of V(1) through V(n) is stored in FIG. 21, and the various V(i) values or the values calculated based on these are EXORed with the n positions of 32-bit data selected from the MPEG 2 transport stream in order, and data rewriting is executed, and scrambling processing is performed. Now, one value, for example only V(1) can be set as the scramble rule, and the same value V(1) or a value calculated based on this can be EXORed to the n positions of 32-bit data selected from the MPEG 2 transport stream.

In the case of performing EXOR as the scrambling processing, the scramble rule recorded onto the information recording medium has the rule shown in FIG. 21, that is to say the EXOR calculation executing value or the value to be the basis for the executing value is recorded. In the event of descrambling in the playback processing, the original data can be restored by EXORing this value or the value calculated based on this value again as data of a predetermined position.

Returning to FIG. 20, the transition of the content (MPEG 2 stream data) in the case of executing scrambling processing (EXOR processing) with an authoring facility will continue to be described. With the authoring facility, for example the scramble rule shown in FIG. 21 is used and EXOR processing is executed, and the EXOR-completed plaintext shown in FIG. 20(B) is generated, and this data is provided to the disk plant which is the encryption facility.

The disk plant which is the encryption facility executes encryption processing as to this received data, and generates the EXOR-completed encrypted text shown in FIG. 20(C). The encryption processing uses processing which uses the AES_ECBC mode described earlier with reference to FIG. 10 through FIG. 12.

Thus, even if the data subjected to EXOR performed is decoded, the correct data cannot be acquired. In order to acquire the correct data, descrambling processing is necessary wherein the predetermined n-bit (32-bit) value used for EXOR is EXORed with the predetermined positions, and the original transport stream data is restored. The predetermined n-bit (32-bit) value is regulated by the scramble rule, and scramble rule deciphering with the appropriate procedures must be performed.

In the event of using EXOR processing as the scrambling processing, as the selection configuration of the data to be processed with EXOR, either the processing in (a) or (b) as follows can be used.

(a) EXOR processing is performed with a predetermined pattern and without regard to the data content.

(b) EXOR processing is performed on specified selected positions.

Further, in the case of performing EXOR processing only to specified selected position as in the above (b), one of the following three positions can be selected as the EXOR use position.

(b1) a portion of the VLC wherein a slice of an I-picture is encoded (variable length run length encoded data)

(b2) a portion or all of the sequence header (b3) a PID within a TS packet

Each of these settings examples will be described.

(b1) a portion of the VLC wherein a slice of an I-picture is encoded (variable length run length encoded data)

The MPEG 2 encoded data is configured of GOP (Group of Pictures) data which is configured with I-, P-, and B-pictures. An I-picture is the image data to be used as a standard, and the P- and B-pictures are data configured from the difference data each from the I-picture or the like, and when the configuration of the I-picture is distorted, reproducing (decoding) the frame data contained in the GOP is difficult.

Also the VLC wherein the slice of the I-picture is decoded is run length encoded data of the I-picture as the backbone data, and in the event that EXOR calculations are performed using the predetermined n-bit (32-bit) value as to this VLC, replaying the original data with the decoding of the EXOR calculation processing data becomes impossible, and effective scrambling is realized.

Even in the event that EXOR processing is performed without regard to the data content, the greater part of the transport stream is VLC data, and so there is a high probability of effectively scrambling the data. That is to say, if the processed data is played back, the correct image will not show.

Figure 22:
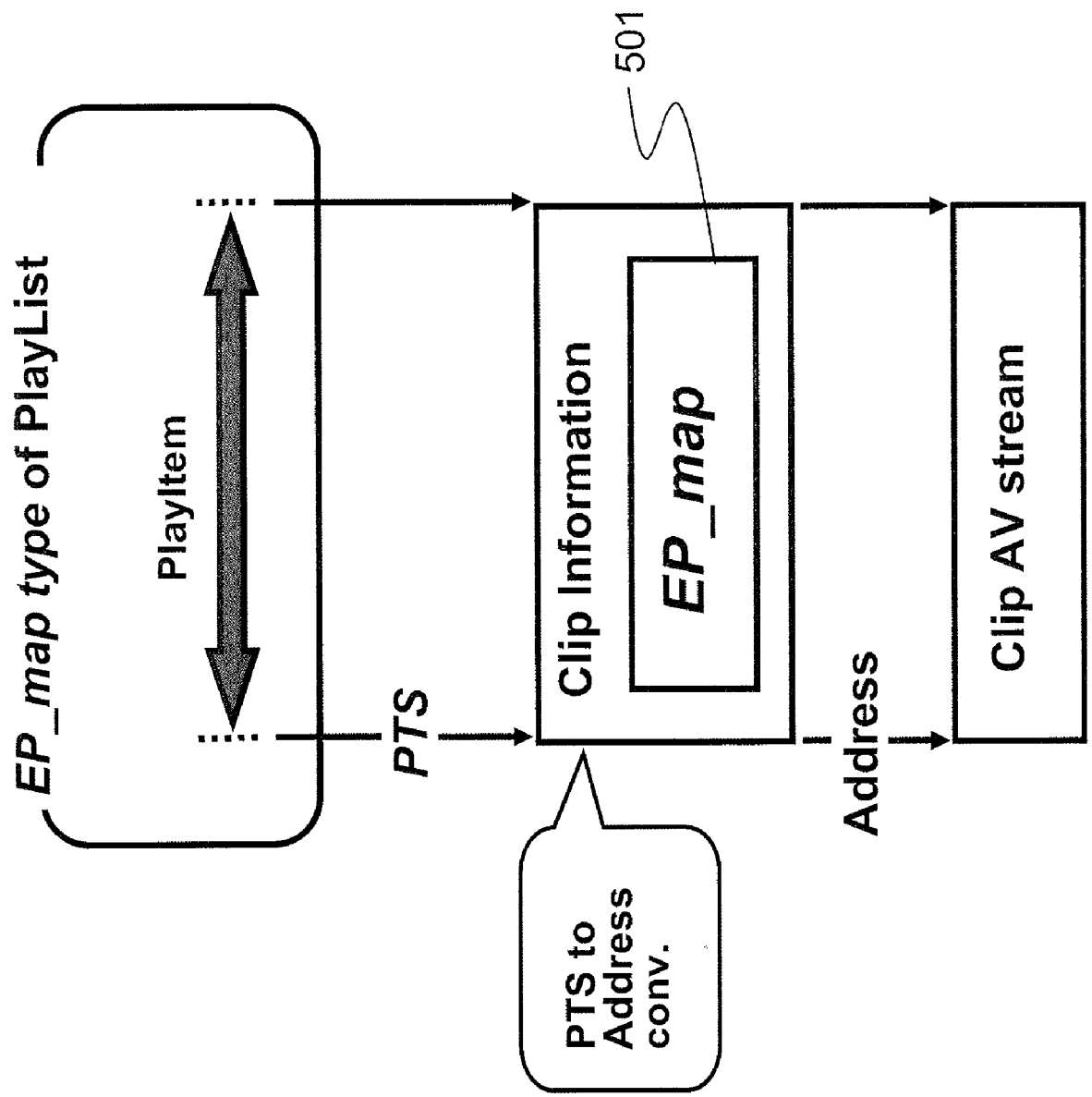
FIG. 22 is a diagram describing an EP map which can be used for acquiring a position of an I-picture for example which comprises the MPEG data.

The location of the I-picture can be found with an EP map (EP_map) contained in the clip information. As shown in FIG. 22, an EP map (EP_map) 501 is data contained in the clip information.

Figure 23:
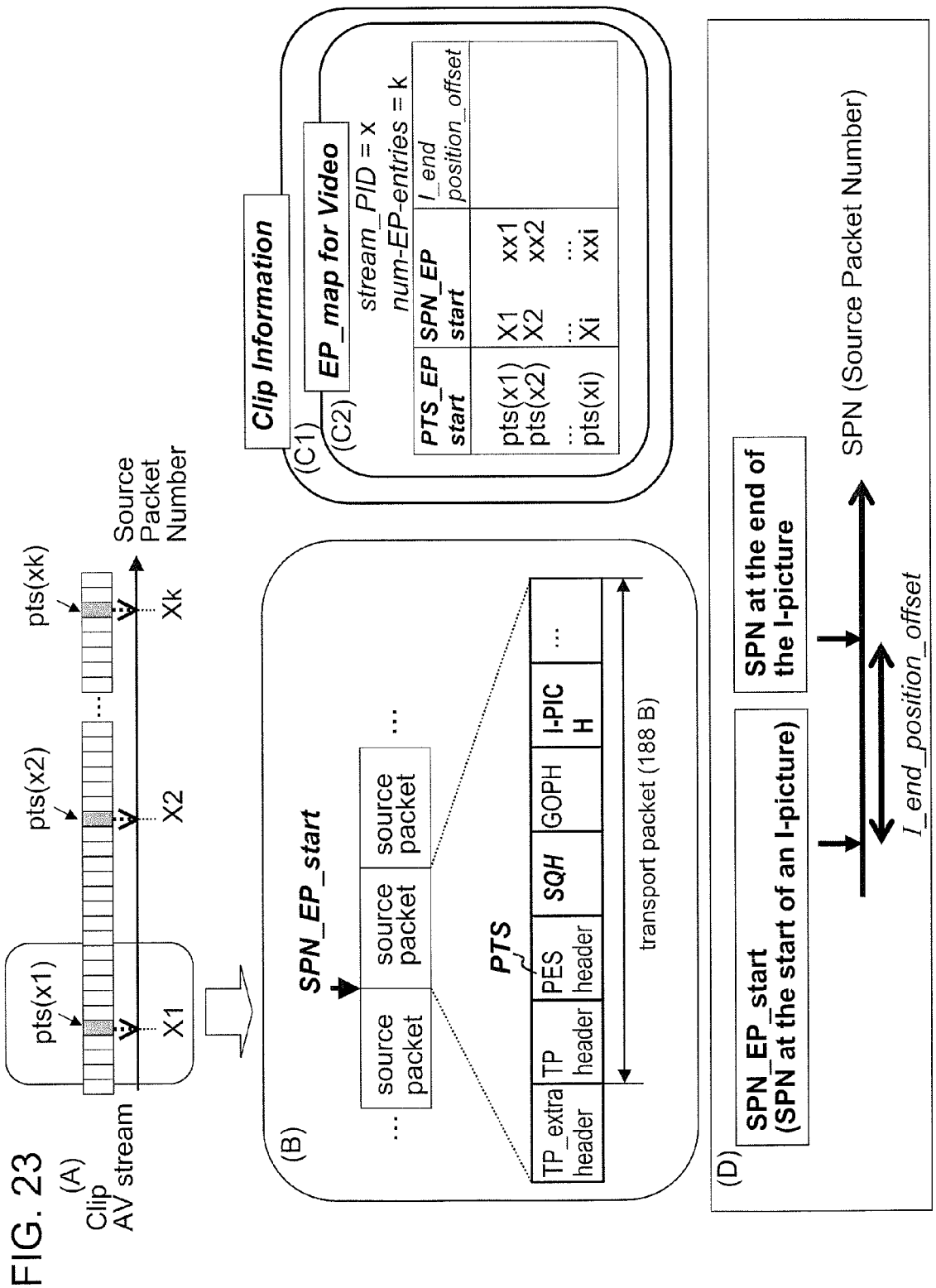
FIG. 23 is a diagram describing an EP map which can be used for acquiring a position of an I-picture for example which comprises the MPEG data.

The detecting of the I-picture location based on the EP map will be described with reference to FIG. 23. FIG. 23(A) shows a clip AV stream, and each rectangle shows a 192-bit source packet. Each source packet has a time stamp set therein, and the playback processing time is regulated.

FIG. 23(B) shows a detailed configuration of the source packet No. (X1). One source packet comprises a TP_extra header and a transport packet, and the transport packet comprises various header information and I-PICH data and the like as the MPEG 2 entity data.

The clip information shown in FIG. 23(C) contains an EP map as described above. The EP map contains the various data [PTS_EP start], [SPN_EP start], and [I_end_position_offset], as shown in the diagram. The definitions of the various data is as follows.

PTS_EP_start: a time stamp corresponding to a source packet containing a sequence header.

SPN_EP_start: a heading address of a source packet containing a sequence header.

I_end_position_offset: an offset of a source packet containing the end of the I-picture from the source packet containing a sequence header.

FIG. 23(D) shows the data relationship herein.

In other words, as shown in FIG. 23(B), the configuration of the data contained in the source packet is regulated, and by finding the various data [PTS_EP start], [SPN_EP start], and [I_end_position_offset] as shown in FIG. 23(C) from the EP map, the I-picture locations in the source packet can be found, based on this data.

At the time of data recording and at the time of data playback, the I-picture location is found from the EP map information, and EXOR is performed using the predetermined n-bit (32-bit) value.

However, the configuration can be such that the EP map is not used, but rather a table is prepared which describes all of the Logical Block Addresses of the positions to be EXORed, and the scramble location is found based on this table. In this event, this table is also recorded on the information recording medium as a scramble rule. In the case of executing descrambling in the event of playback processing, the scramble (EXOR) location and value are acquired based on the scramble rule formed from this table and the EXOR value shown in FIG. 22, and EXOR processing is executed and descrambling is performed.

Figure 24:
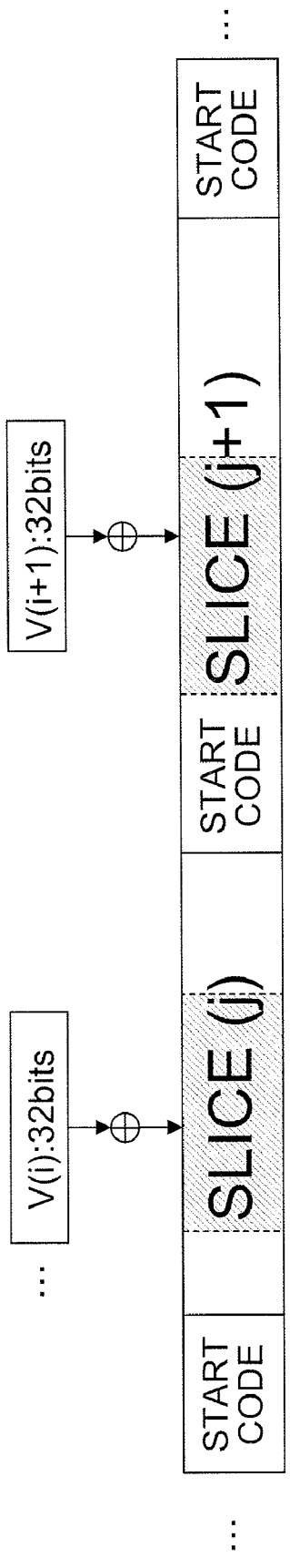
FIG. 24 is a diagram describing a processing example in the event of executing Exclusive-OR (EXOR) processing as the scrambling processing as to a slice of an I-picture.

The scrambling of the VLC wherein an I-picture slice is encoded, that is to say a processing example wherein EXOR calculation is executed, will be described with reference to FIG. 24. As shown in FIG. 24, the VLC wherein an I-picture slice is encoded, is sectioned by a start code showing the head location of each slice, and with the authoring facility, the value determined based on the scramble rule (32-bit value Vi) is acquired, and EXOR processing is executed to the n-bit (32-bit) value acquired from the scramble rule to the predetermined slice location of the MPEG 2 transport stream.

Each slice has VLC coding, and so when rewriting of a portion occurs due to the EXOR calculations, decoding (MPEG decoding) of the entire GOP corresponding to the slice becomes impossible. Thus, with the scrambling, or EXOR processing, of the VLC wherein an I-picture slice is encoded, scrambling can be effective.

(b2) a portion or all of the sequence header

Next, an example which sets a portion or all of the sequence header as data to be EXOR calculated will be described.

The sequence header is a header attached to the front of the GOP. The location of this sequence header can also be calculated based on the EP map described earlier. As with the above-described case, the configuration can be such that the EP map is not used, but rather a table is prepared which describes all of the Logical Block Addresses of the positions to be EXORed, and the scramble location is found based on this table. In this event, this table is also recorded on the information recording medium as a scramble rule. In the case of executing descrambling in the event of playback processing, the scramble (EXOR) location and value are acquired based on the scramble rule formed from this table and the EXOR value shown in FIG. 22, and EXOR processing is executed and descrambling is performed.

The sequence header has information recorded for determining the processing form of the MPEG decoding processing, and without this information the correct decoding (MPEG decoding) is impossible. Accordingly, by rewriting the values of this sequence header with EXOR calculations, data restoring can be made impossible, and so an effective scramble is realized.

Figure 25:
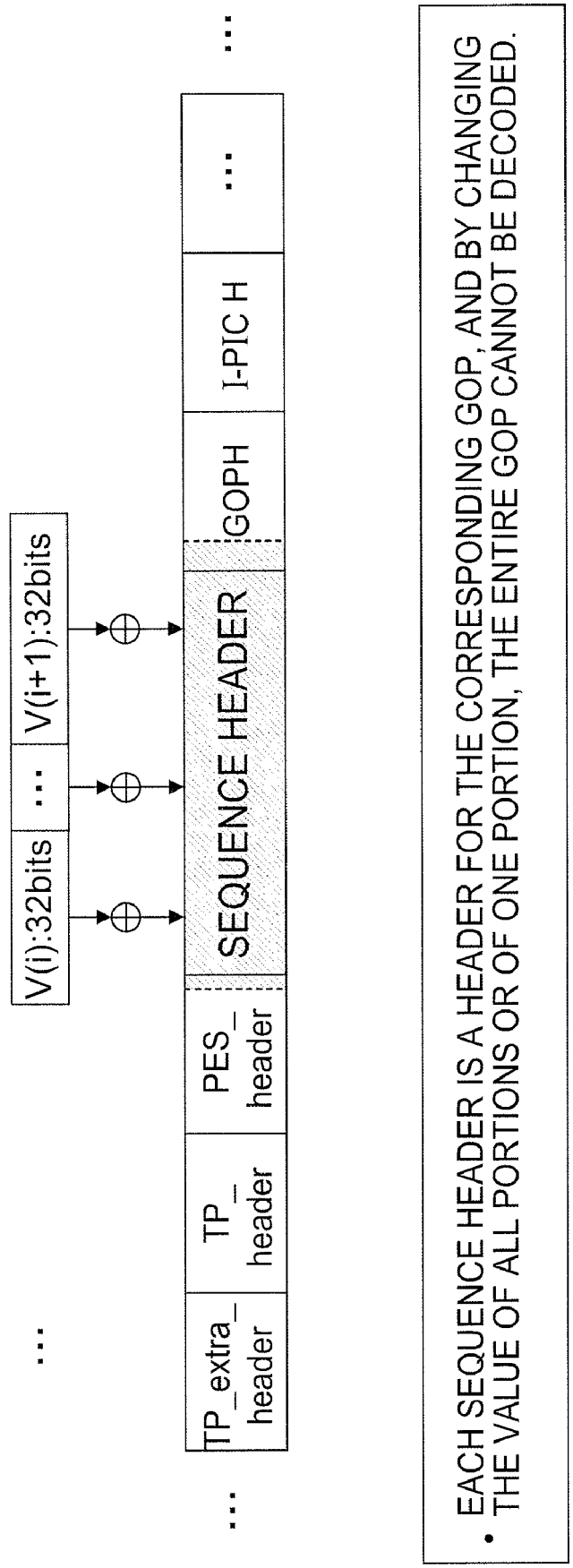
FIG. 25 is a diagram describing a processing example in the event of executing Exclusive-OR (EXOR) processing as the scrambling processing as to a sequence header.

The scrambling of the sequence header, that is to say a processing example wherein EXOR calculation is executed, is shown in FIG. 25. As shown in FIG. 25, multiple 32-bit values V(i) are used for the data region containing the sequence header, and EXOR processing is executed.

The value to be used for EXOR is acquired from the scramble rule. In other words, for example the data regulating the various 32-bit values shown in FIG. 22 is used. In the case of descrambling also, the data is acquired and by executing EXOR processing to the same location, the original sequence header information can be acquired.

(b3) a PID within a TS packet

Next, an example which sets a PID within a TS packet as data to be EXOR calculated will be described.

The PID in the TS packet is 13-bit data within the transport packet (see FIG. 19). This PID data is either data contained in the transport packet, or is data for distinguishing the data type such as whether it is video data or audio data, and is incomplete data for decoding processing. Rewriting this data with EXOR calculations, makes correct decoding impossible, and so effective scrambling is realized.

The PID location within the TS packet is regulated in advance, and can be easily found. However, even in the case of this processing example, as with the above-described example, the configuration can be such that a table is prepared which describes all of the Logical Block Addresses of the positions to be EXORed, and the scramble location is found based on this table. In this event, this table is also recorded on the information recording medium as a scramble rule. In the case of executing descrambling in the event of playback processing, the scramble (EXOR) location and value are acquired based on the scramble rule formed from this table and the EXOR value shown in FIG. 22, and EXOR processing is executed and descrambling is performed.

Figure 26:
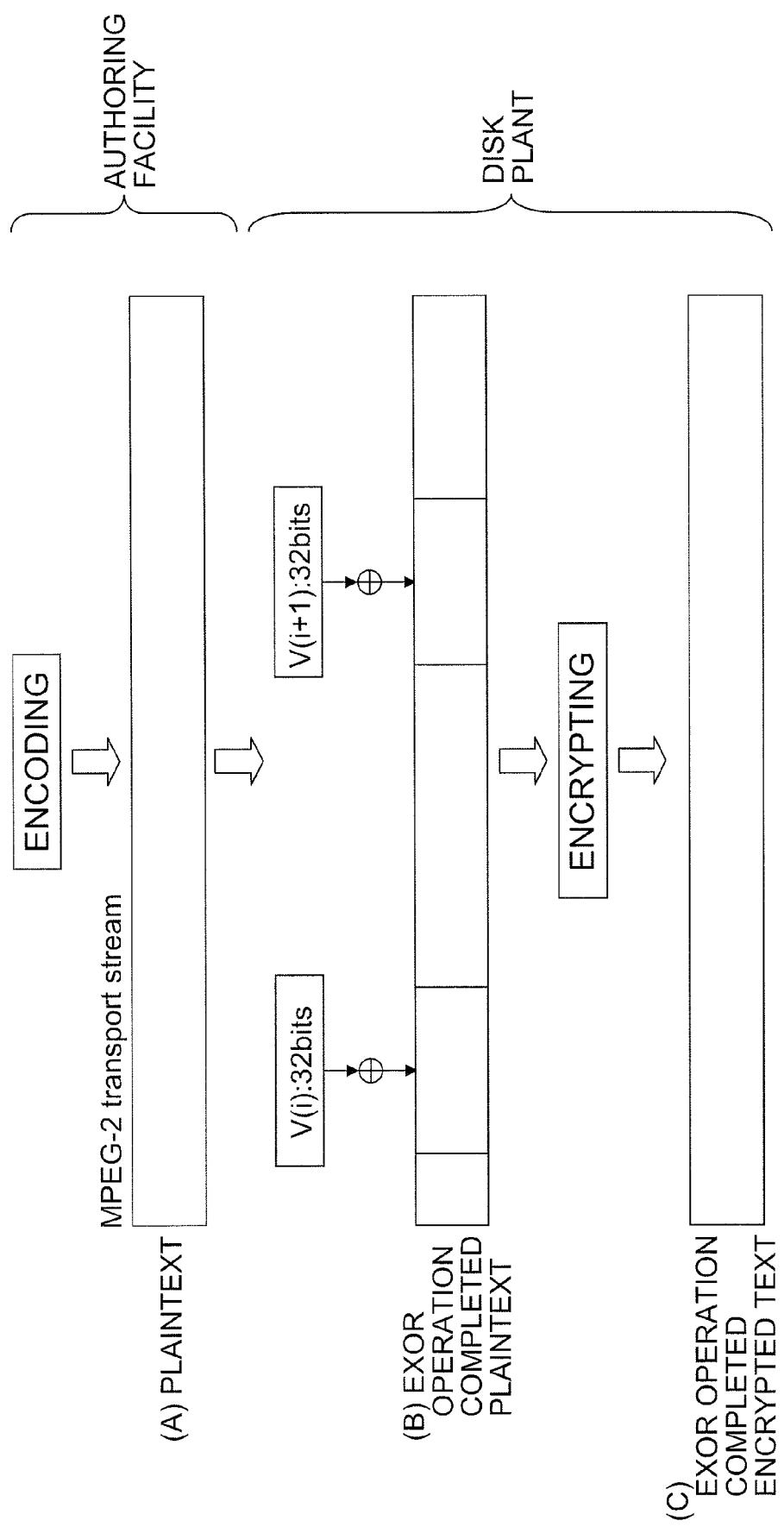
FIG. 26 is a diagram describing content data transition in the event of executing Exclusive-OR (EXOR) processing as the scrambling processing in the event of executing scrambling processing with the encrypting facility.

With the processing example described earlier with reference to FIG. 20, a process example wherein the authoring facility executes the EXOR calculation processing as the scrambling processing has been described, but next, an example wherein two scrambling processes which are EXOR calculation processing and encryption processing are executed in the disk plant (encryption facility) will be described with reference to FIG. 26.

FIG. 26(A) shows data making up the MPEG 2 transport stream. The authoring facility generates the MPEG 2 transport stream as the edited content, and provides this to the disk plant which is an encryption facility.

The disk plant which is an encryption facility acquires the value (32-bit value Vi) which is determined based on the scramble rule, and executes EXOR processing of the n-bit (32-bit) value acquired from the scramble rule at position of configuration data in the predetermined MPEG 2 transport stream, and generates the EXOR-completed plaintext in FIG. 26(B).

The scramble rule is set as the rule shown in FIG. 21, for example. The 32-bit data of V(1) through V(n) is stored in FIG. 21, and the various V(i) values are EXORed to the n positions of 32-bit data selected from the MPEG 2 transport stream in order, and data rewriting is executed, and scrambling processing is performed. Now, one value, for example only V(1) can be set as the scramble rule, and the same value V(1) can be EXORed sequentially to the n positions of 32-bit data selected from the MPEG 2 transport stream.

The disk plant which is an encryption facility further executes encryption processing as to this data, and generates EXOR-completed text as shown in FIG. 26(C). The encryption processing uses the processing using AES_ECBC mode as described earlier with reference to FIG. 10 through FIG. 12.

Thus, even if the data having EXOR performed is decoded, the correct data cannot be acquired. In order to acquire the correct data, descrambling processing is necessary wherein the predetermined n-bit (32-bit) value used for EXOR is EXORed to the predetermined positions, and the original transport stream data is restored. The predetermined n-bit (32-bit) value is regulated by the scramble rule, and scramble rule deciphering with the appropriate procedures must be performed.

[(2-3) Rotation Processing]

Next, a processing example using rotation processing as the scrambling processing will be described.

The processing used for rotation processing as the scrambling processing is executed as processing which executes rotation by the number of bits as regulated by the scramble rule, to the n-bit (for example 32-bit) data in a predetermined position on the transport stream data of the plaintext. The predetermined number of rotation bits is a value which is regulated by the scramble rule.

Figure 27:
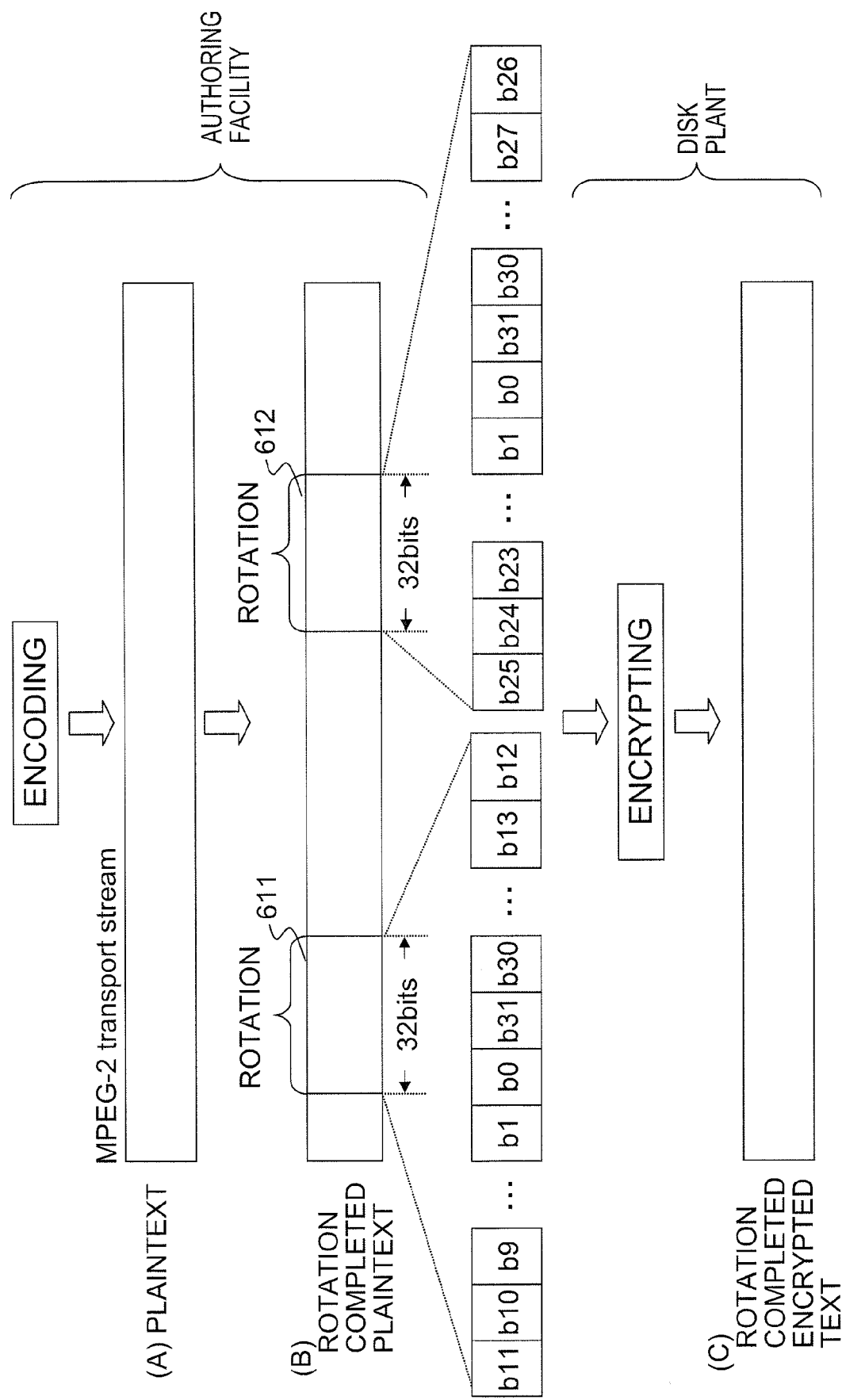
FIG. 27 is a diagram describing content data transition in the event of executing rotation processing as the scrambling processing.

The transition of the content (MPEG 2 stream data) in the case of executing scrambling processing (rotation processing) at an authoring facility will be described with reference to FIG. 27.

FIG. 27(A) shows data making up an MPEG 2 transport stream. With the authoring facility, the number of rotation bits which is determined based on the scramble rule is acquired, and rotation processing by the number of bits acquired based on the number of rotation bits acquired from the scramble rule is executed as to the comprising bits in rotation regions 611 and 612 of the predetermined MPEG 2 transport stream, and the rotated plaintext in FIG. 27(B) is generated.

Figure 28:
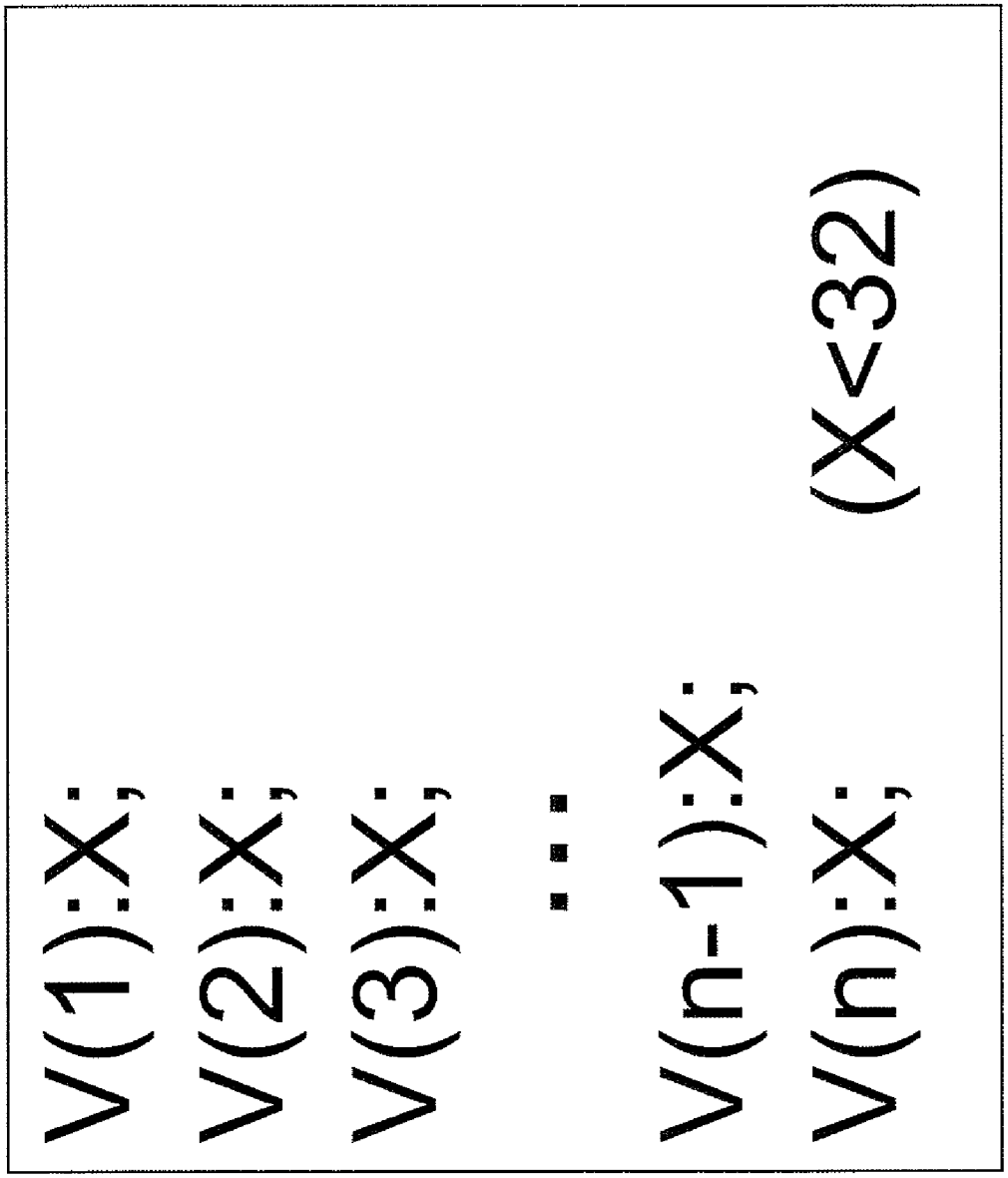
FIG. 28 is a diagram describing a scramble rule in the event of executing rotation processing as the scrambling processing.

The scramble rule is set as the rule shown in FIG. 28 for example. The data of the number of rotation bits of V(1) through V(n) is stored in FIG. 28.

Using this table, the following rotation (bit exchange) is performed.

The first rotation position is bit shifted by V(1) to the left.

The second rotation position is bit shifted by V(2) to the left.

The third rotation position is bit shifted by V(3) to the left.

The nth rotation position is bit shifted by V(n) to the left.

In the event of executing rotation processing as the scrambling process, this table is stored in the information recording medium as the scramble rule. This table is encrypted and recorded to the disk for example so the rule is not deciphered. For all rotation positions, rotation can be performed by the same number of bits, and in this case, one shift amount [V(1)] is the only scramble rule needed for regulating. So for example, in the case of performing rotation within a 32-bit unit, the shift amount X is regulated with a setting of X, 32.

In the event of executing rotation processing as the scrambling process, the scramble rule recorded in the information recording medium is the rule shown in FIG. 28, that is to say the data value of the number of rotation bits, is recorded. In the event of descrambling during playback processing, the original data can be restored by executing reverse rotation again based on this value.

Returning to FIG. 27, the transition of the content (MPEG 2 stream data) in the case of executing scrambling processing (rotation processing) with an authoring facility will continue to be described. With the authoring facility, for example the scramble rule shown in FIG. 28 is used and rotation processing is executed.

The 32-bit data at the rotation location 611 is the 32-bit data set initially in the sequence b0 through b31, but the [b11] is shifted to the head by the rotation. In other words, 11-bit left shifting is executed. Similarly, the 32-bit data at the rotation location 612 is the 32-bit data set initially in the sequence b0 through b31, but the [b25] is shifted to the head by the rotation. In other words, 25-bit left shifting is executed. This shift amount is determined based on the scramble rule. The authoring facility executes such rotation processing based on the scramble rule, and rotated plaintext is generated as shown in FIG. 27(B), and this data is provided to the disk plant which is the encryption facility.

The disk plant which is the encryption facility executes encryption processing as to this received data, and generates the rotated encrypted text shown in FIG. 27(C). The encryption processing uses processing which uses the AES_ECBC mode described earlier with reference to FIG. 10 through FIG. 12.

Thus, even if the data having rotation processing performed is decoded, the correct data cannot be acquired. In order to acquire the correct data, the execution location data of the rotation process must be reverse-rotated correctly in the amount of the number of executed rotation bits, and with this processing, descrambling can be performed. The number of rotation bits is regulated by the scramble rule, and scramble rule deciphering with the appropriate procedures must be performed.

In the event of using rotation processing as the scrambling processing, either the processing in (a) or (b) as follows can be used, as with the position of the data to be processed with EXOR.

(a) Rotation processing is performed with a predetermined pattern and without regard to the data content.

(b) Rotation processing is performed at specified selected positions only.

Further, in the case of performing rotation processing only at specified selected position as in the above (b), one of the following three positions can be selected as the rotation position.

(b1) a portion of the VLC wherein a slice of an I-picture is encoded (variable length run length encoded data)

(b2) a portion or all of the sequence header (b3) a PID within a TS packet

Figure 29:
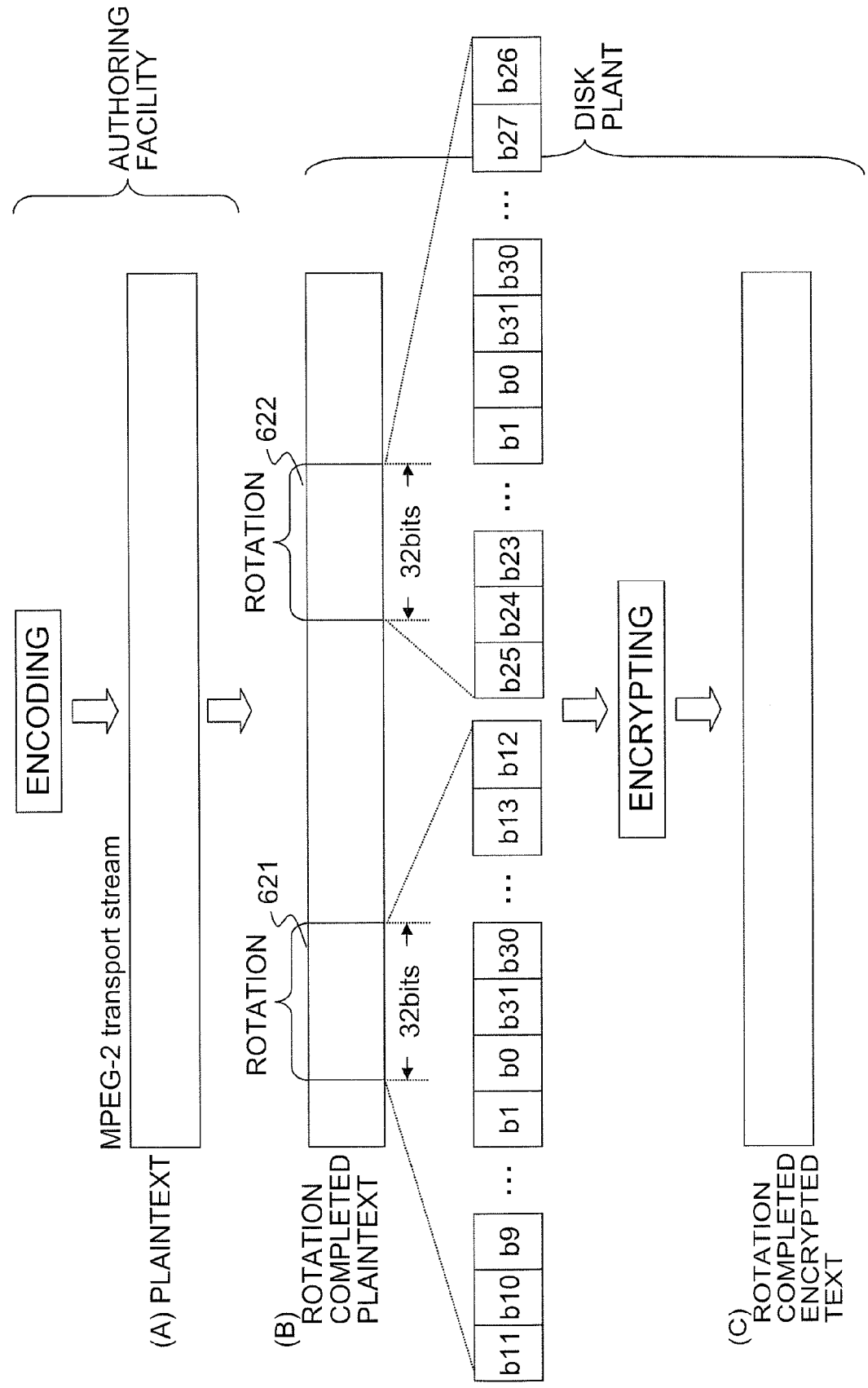
FIG. 29 is a diagram describing content data transition in the event of executing rotation processing as the scrambling processing in the event of executing scrambling processing with the encrypting facility.

With the processing example described with reference to FIG. 27, a process example wherein the authoring facility executes the rotation processing as the scrambling processing has been described, but next, an example wherein two scrambling processes which are rotation processing and encryption processing are executed in the disk plant (encryption facility) will be described with reference to FIG. 29.

FIG. 29(A) shows data making up the MPEG 2 transport stream. The authoring facility generates the MPEG 2 transport stream as the edited content, and provides this to the disk plant which is an encryption facility.

The disk plant which is an encryption facility acquires the number of rotation bits which is determined based on the scramble rule, and executes rotation processing in the number of rotation bits acquired from the scramble rule at the position of configuration data in the predetermined MPEG 2 transport stream, and generates the rotated plaintext in FIG. 29(B).

With the 32-bit data in the rotation region 621, [b11] is shifted to the head by the rotation. In other words, 11-bit left shifting is executed. Similarly, with the 32-bit data at the rotation region 622, [b25] is shifted to the head by the rotation. In other words, 25-bit left shifting is executed. This shift amount is determined based on the scramble rule. The scramble rule is set as the rule shown in FIG. 28 for example. The disk plant which is the encryption facility executes encryption processing further as to this data, and generates the rotated encrypted text shown in FIG. 29(C). The encryption processing uses processing which uses the AES_ECBC mode described earlier with reference to FIG. 10 through FIG. 12.

Thus, even if the data subjected to rotation is decoded, the correct data cannot be acquired. In order to acquire the correct data, the execution location data of the rotation process must be reverse-rotated correctly in the amount of the number of executed rotation bits, and with this processing, descrambling can be performed. The number of rotation bits is regulated by the scramble rule, and scramble rule deciphering with the appropriate procedures must be performed.

Now, up to this point, shuffling processing, EXOR processing, and rotation processing have been described as three types of scrambling processing forms, but these scrambling processes can be combined and used.

Also, as the data used for scrambling processing, with the EXOR processing and rotation processing, settings examples which have data containing at least one of the following have been described.

(1) a portion of the I-picture slice encoded data contained in the MPEG encoded data (2) a portion of the sequence header (3) PID data which has information recorded which is data type specific within the transport stream packet However, in the same way, the shuffling processing also can be performed with data containing one of the above (1) through (3) being selected. [3. Configuration Examples of the Information Processing Device]

Figure 30:
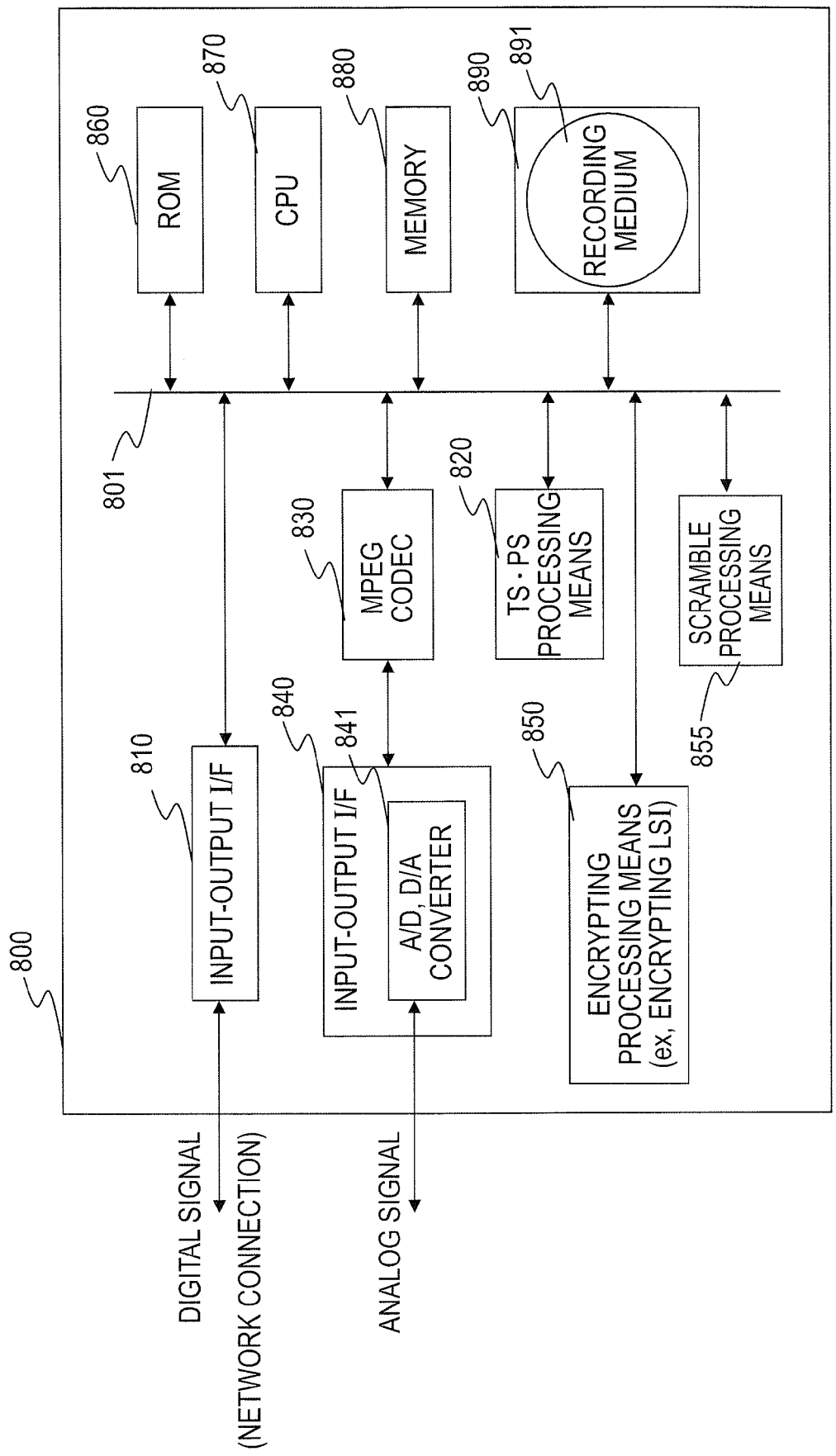
FIG. 30 is a diagram describing a configuration example of an information processing device for recording information or executing playback processing as to the information recording medium.

Next, examples of the information processing device which performs playback processing or recording processing of the content having performed the above-described scrambling processes will be described with reference to FIG. 30.

The information processing device 800 drives the information recording medium 891, and comprises a drive 890 for performing input and output of the data recording playback signal, a CPU 870 for executing data processing according to the various programs, ROM 860 serving as a storage region for programs, parameters, and the like, memory 880, an input/output I/F 810 for inputting and outputting a digital signal, an input/output I/F 840 which inputs and outputs an analog signal and which has an A/D, D/A converter 841, an MPEG codec 830 for executing encoding and decoding processing for MPEG data, a TS/PS processing means 820 for executing TS (Transport Stream)/PS (Program Stream) processing, an encryption processing means 850 for executing various encryption processing, and a scrambling processing means 855 for executing scrambling processing or descrambling processing, with a bus 801 being connected to each block.

First, the operation at the time of data recording will be described. As data performing recording, the two cases of digital signal input and analog signal input can be considered.

In the case of digital signals, the signal is input from the digital signal input/output I/F 810, and converted to a data format for saving by the CPU 870 and the TS/PS processing means 820, and data conversion processing to for example an MPEG 2 format is performed by the MPEG codec 830, and scrambling processing according to the predetermined scramble rule is executed with the scrambling processing means 855. The scramble rule is stored for example in the memory 880. The form of the scrambling processing to be performed is the applicable one of shuffling processing, EXOR processing, or rotation processing, as described above. In the case of using any one of shuffling processing, EXOR processing, or rotation processing, rules which differ for each content or content management unit can be used.

Also, the configuration can be such that rather than using one method of scrambling processing among the shuffling processing, EXOR processing, or rotation processing, a multiple of the shuffling processing, EXOR processing, or rotation processing can be combined and used.

The data subjected to scrambling is then subjected to encryption processing by the encryption processing means 850. The encryption processing is executed as processing using for example AES_ECBC mode, as described with reference to FIG. 10 through FIG. 12. The encryption processing units using AES_ECBC mode can be 2 KB unit, 6 KB units, or other various settings. The data on which encryption processing is performed by the encryption processing means 850 is saved to the information recording medium 891.

In the case of analog signals, the analog signal input to the input/output I/F 840 is converted to a digital signal by the A/D converter 841, and is converted to the codec to be used at time of recording by the MPEG codec 830. After this, the data is converted to AV multiplexed data, which is a recorded data format, by the TS/PS processing means 820, and as needed, scrambling processing by the scrambling processing means 855 and encoding processing by the encoding processing means 850 are performed, and the data is saved to the recording medium 891.

Next, processing in the event of performing data playback from the information recording medium will be described. For example, in the event that playback of AV stream data, which is formed of MPEG-TS data, is to be performed, when the data which is read out from the information recording medium 891 in the drive 890 is identified as a content management unit, the acquiring processing of the unit key corresponding to the content management unit is executed, and based on the acquired unit key, encryption is solved with the encryption processing means 850, and after this, descrambling processing is executed.

In the event of descrambling processing, the scramble rule is read out from the information recording medium 891, and the scramble rule used for the content to be played back must be deciphered. For example, in the case that content scrambling is executed as shuffling, the scramble rule with the settings for the shuffle element sequence shown in FIG. 9(A) is acquired, if execution is with EXOR, the scramble rule with the settings for the EXOR value shown in FIG. 21 is acquired, and if execution is with rotation, the scramble rule with the settings for the number or rotation (shift) bits is acquired, and based on these acquired rules the descrambling is executed. As described above, the analyzing of the scramble rules and the descrambling processing are executed as secure data processing. Specifically, the scramble rules stored in the information recording medium for example are recorded with a Java secure code, and the scramble rule deciphering and descrambling processing are executed with Java VM (virtual machine) set in the information processing device which executes content playback.

The content data on which descrambling is performed is then divided into various data such as Video, Audio, or Captions, by the TS (Transport Stream)/PS (Program Stream) processing means 820. Further, the digital data decrypted with the MPEG codec 830 is converted to an analog signal by the D/A converter 841 within the input/output I/F 840. Also in the event of performing digital output, the MPEG-TS data is output as digital data through the input/output I/F 810. The output in this case is performed as to a digital interface such as IEEE 1394 or Ethernet cable or wireless LAN. In the event of corresponding to the network connection function, the input/output I/F 810 provides functionality for network connections. Also, in the event of converting and outputting data to a format receivable by an output device within the playback device, rate conversion and codec conversion processing is added with the MPEG codec 830 as to the Video, Audio, and Captions separated during the TS/PS processing means 820, and the data having been multiplexed again to MPEG-TS or MPEG-PS with the TS/PS processing means 820 is output from the digital input/output I/F 810. Also, conversion can be made to a codec other than MPEG, or to a multiplexed file using the CPU 870, for output from the digital input/output I/F 810.

The program which executes playback processing and recording processing is stored in the ROM 860, and during the program execution processing, the memory 880 is used as needed for storing parameters and data, and as a work area. In FIG. 30, the device configuration is described as being capable of data recording and playback, but devices with playback functionality only, or with recording functionality only can be configured, and the present invention can be applicable to such devices also.

The present invention has been described in detail above with reference to specified embodiments. However, it should be understood that various changes and modifications to the embodiments could be made by one skilled in the art without departing from the spirit or scope of the invention. In other words, the present invention is disclosed in the form of examples, and should not be given a limited interpretation. In order to determine the scope of the present invention, the appended claims should be referred to.

The series of processing described in the description herein can be executed with a configuration of hardware, or software, or a combination thereof. In the case of executing processing with software, a program storing the processing sequence can be installed into the memory of the computer which has built-in dedicated hardware, with executing being performed, or a program can be installed into a general-use computer wherein various types of processing can be executed.

For example, the program can be recorded in advance on a hard disk or in ROM (Read Only Memory) serving as the recording medium. Alternatively, the program can be stored (recorded) temporarily or permanently onto a removable recording medium such as a flexible disk, CD-ROM (Compact Disc Read Only Memory), MO (Magneto optical) disk, DVD (Digital Versatile Disc), magnetic disk, or semiconductor memory. Such removable recording media can be provided as so-called packaged software.

Other installing the program on the computer from the above-described removable recording media, the program can be wirelessly transferred to the computer from a download site, or can be transferred by wire to the computer via a network such as a LAN (Local Area Network) or the Internet, and the computer can receive the program transferred in such a manner and install the program onto a recording medium such as an internal hard disk.

The various processing described in the description herein does not need to be executed chronologically according to the description, and can be executed in parallel or individually according to the processing capability of the device to execute the processing, or as needed. Also, system as used in the present description refers to a logical group of multiple devices, and is not limited to the various configurations being within one enclosed unit.

INDUSTRIAL APPLICABILITY

As described above, according to the present invention, scrambling processing forms with various differing forms are set, rather than setting uniform processing for scrambling processing of the various content as requested by the usage management system such as copyright management, and scrambling processing is executed with a form being selected for each content or each management unit from a large number of scrambling processing forms, and therefore, if by chance there is an event wherein scrambling for a given content is unauthorizedly decoded and the content is leaked, the content which has a scrambling process with a different scrambling form cannot be descrambled, and so leakage of content can be kept to a minimum.

With the configuration according to the present invention, scrambling processes such as shuffling processing, EXOR processing, and rotation processing are executed, and with shuffling processing, various shuffle forms are specified as the scramble rules, and with EXOR processing, values applicable to EXOR are specified as the scramble rules, and with rotation processing, the rotation shift amounts are specified as the scramble rules. For example, in the case of using 32 shuffle elements with shuffling processing, 32! different shuffle forms, that is to say, scramble rules, can be specified. Also, with EXOR, the values applicable to EXOR, and with rotation processing, the various values of the shift amount, can be set, and so a large number of scramble rules can be set, and a configuration is realized wherein scrambling of each content based on the rules selected from this large number of scramble rules is performed, and based on the leakage of specified scramble rules, leakage of a large amount of content can be prevented.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information recording medium manufacturing method comprising:
    acquiring a scramble rule to apply to content to be recorded on an information recording medium, wherein said scramble rule describes a previously set settings value;
    generating scrambled content by executing scrambling processing as to the content, according to the acquired scramble rule, wherein the scrambling processing includes Exclusive-OR computing processing of:
        (a) content data which includes PID data including a data-type information within a transport stream packet; and
        (b) said previously set settings value or a value calculated based on said previously set settings value; and
    recording:
        (a) the generated scrambled content;
        (b) a table describing locations of the content data which includes said PID data including said data-type information within said transport stream packet executed in the Exclusive-OR computing processing; and
        (c) the scramble rule applied to the content which includes said PID data including said data-type information within said transport stream packet, onto an information recording medium.

2. The method of claim 1, which includes acquiring another scramble rule for another recording content or for a management unit, in the event of a plurality of content to be recorded to the information recording medium.

3. The method of claim 1, which includes performing processing to replace at least one portion of the content data to be recorded to said information recording medium; and
    wherein said scramble rule includes data which points to the position to which the content data is to be replaced.

4. The method of claim 1, which includes:
    acquiring another scrambling rule to apply to another content to be recorded on the information recording medium;
    generating another scrambled content by executing another scrambling processing which includes shuffling processing of shuffle elements which are set as content-comprising data; and
    wherein said another scramble rule includes data which describes the shuffle state of said shuffle elements.

5. The method of claim 1, which includes:
    acquiring another scrambling rule to apply to another content to be recorded on the information recording medium;
    generating another scrambled content by executing another scrambling processing which includes rotating processing of the content-comprising data; and
    wherein said another scramble rule includes data describing a shift amount in the rotation.

6. The method of claim 1, which includes executing encrypting processing of the recorded content of the information recording medium, after executing said scrambling processing step, or before executing the same.

7. The method of claim 6, which includes:
    generating another scrambled content by executing another scrambling processing which includes shuffling processing of shuffled elements which are set as content-comprising data; and
    executing encrypting processing in CBC mode on data units the same size as that of said shuffled elements.

8. The method of claim 1, wherein the content data for processing which is executed in the Exclusive-OR computing further includes at least one of the following:
    (1) a portion of I-picture slice encoded data included in MPEG encoded data; and
    (2) a portion of the sequence header.

9. An information processing device for executing content recording processing as to an information recording medium, the information processing device comprising:
    a processor;
    a memory device which stores instructions, which when executed by the processor, cause the processor to:
        (a) acquire acquiring a scramble rule to be applied to content to be recorded on the information recording medium, wherein said scramble rule describes a previously set settings value;
        (b) generate scrambled content by executing scrambling processing as to the content according to the acquired scramble rule, the scrambling processing including Exclusive-OR computing processing of:
            (i) content data which includes PID data including a data-type information within a transport stream packet; and (ii) said previously set settings value or a value calculated based on said previously set settings value; and (c) record:
(i) the generated scrambled content;
(ii) a table describing locations of the content data which includes said PID data including said data-type information within said transport stream packet executed in the Exclusive-OR computing processing; and
(iii) the scramble rule applied to this content which includes said PID data including said data-type information within said transport stream packet, to the information recording medium.

10. The information processing device of claim 9, wherein when executed by the processor, the plurality of instructions cause the processor to acquire another scramble rule for another recording content or for a management unit, in the event of a plurality of content to be recorded to the information recording medium.

11. The information processing device of claim 9, wherein when executed by the processor, the plurality of instructions cause the processor to replace at least one portion of the content data to be recorded to said information recording medium;
and wherein said scramble rule includes data which points to the position to which the content data is to be replaced.

12. The information processing device of claim 9, wherein when executed by the processor, the plurality of instructions cause the processor to:
acquire another scrambling rule to apply to another content to be recorded on the information recording medium;
generate another scrambled content by executing another scrambling processing which includes shuffling processing of shuffle elements which are set as content-comprising data; and
wherein said another scramble rule includes data which describes the shuffle state of said shuffle elements.

13. The information processing device of claim 9, wherein when executed by the processor, the plurality of instructions cause the processor to:
acquire another scrambling rule to apply to another content to be recorded on the information recording medium;
generate another scrambled content by executing another scrambling processing which includes rotating processing of the content-comprising data;
and wherein said another scramble rule includes data describing a shift amount in the rotation.

14. The information processing device of claim 9, wherein when executed by the processor, the plurality of instructions cause the processor to execute encrypting processing of the recorded content of the information recording medium.

15. The information processing device of claim 14, wherein when executed by the processor, the plurality of instructions cause the processor to:
generate another scrambled content by executing another scrambling processing which includes shuffling processing of shuffled elements which are set as content-comprising data; and
execute encrypting processing in CBC mode on data units the same size as that of said shuffled elements.

16. The information processing device of claim 9, wherein the content data for processing which is executed by said Exclusive-OR computing processing further includes at least one of the following:
(1) a portion of I-picture slice encoded data included in MPEG encoded data; and
(2) a portion of the sequence header.

17. An information processing device for executing playback processing of content recorded on an information recording medium, the information processing device comprising:
a processor;
a memory device which stores instructions, which when executed by the processor, cause the processor to:
(a) descramble the content recorded on the information recording medium by using an Exclusive-OR computing processing of:
(i) content data which includes PID data including a data-type information within a transport stream packet; and
(ii) a previously set settings value or a value calculated based on the settings value;
(b) decipher a scramble rule which corresponds to the content stored in said information recording medium, wherein said scramble rule describes said previously set settings value; and
(c) based on the results of the deciphered scramble rule, descramble the scramble rule for each of a plurality of acquired individual scrambled content data, wherein locations of scrambled content data which includes said PID data including said data-type information within said transport stream packet are found based on a table describing locations of the scrambled content data which includes said PID data including said data-type information within said transport stream packet executed in the Exclusive-OR computing processing.

18. The information processing device of claim 17, wherein when executed by the processor, the plurality of instructions cause the processor to:
acquire another scramble rule for another recording content or for a management unit, in the event of a plurality of content to be recorded to the information recording medium; and
descramble said another recording content according to the acquired another scramble rule.

19. The information processing device of claim 17, wherein when executed by the processor, the plurality of instructions cause the processor to:
replace at least one portion of the content data to be recorded to said information recording medium; and
acquire the position data for pointing to the position to which the acquired content data is replaced from the results of analyzing said scramble rule, and based on this position data, execute descrambling processing.

20. The information processing device of claim 17, wherein when executed by the processor, the plurality of instructions cause the processor to:
decipher another scramble rule which corresponds to the content stored in said information recording medium;
restore a shuffle state of a plurality of shuffle elements which are set as content-comprising data, said another scramble rule includes data describing the shuffle state of said shuffle elements; and
execute shuffle state restoring processing of the shuffle elements based on said another scramble rule.

21. The information processing device of claim 17, wherein when executed by the processor, the plurality of instructions cause the processor to:
descramble another content recorded on the information recording medium by using a rotation processing for the content-comprising data;

decipher another scramble rule which includes data describing the shift amount in the rotation; and execute rotation restoring processing based on said shift amount, based on said another scramble rule.

22. The information processing device of claim 17, wherein when executed by the processor, the plurality of instructions cause the processor to execute decrypting processing of the recorded content of the information recording medium.

23. The information processing device of claim 22, wherein when executed by the processor, the plurality of instructions cause the processor to:

descramble another content recorded on the information recording medium by using a shuffling processing of a plurality of shuffle elements which are set as content-comprising data; and execute decrypting processing in CBC mode on data units the same size as that of said shuffled elements.

24. The information processing device of claim 17, wherein the scrambled content data further includes at least one of the following:

(1) a portion of I-picture slice encoded data included in MPEG encoded data; and (2) a portion of the sequence header.

25. An information recording medium comprising:

recorded data as scrambled content having scrambling processing executed according to a scramble rule set for each recording content or for every management unit, wherein said scramble rule describes a previously set settings value, wherein said scrambled content is generated by Exclusive-OR computing processing of:

(i) content which includes PID data including a data-type information within a transport stream packet; and (ii) said previously set settings value or a value calculated based on said previously set settings value;

a table describing locations of the scrambled content which includes said PID data including said data-type information within said transport stream packet; and the scramble rule applied to said scrambled content which includes said PID data including said data-type information within said transport stream packet.

26. The information recording medium of claim 25, wherein:

said scrambling processing is processing for replacing at least one portion of said content; and said scramble rule is a rule for recording the data showing the position of the portion of data of said content data to be replaced.

27. The information recording medium of claim 25, which includes:

another scrambled content generated by another shuffling processing of a shuffle element set as content-comprising data; and another scramble rule including data describing a shuffle state of said shuffle elements.

28. The information recording medium of claim 25, which includes:

another scrambled content generated by rotation processing of the content-comprising data; and another scramble rule including data describing a shift amount in the rotation.

29. The information recording medium of claim 25, wherein:

said scrambled content is scrambled content generated by shuffling processing of the shuffle elements which as set as content-comprising data; and said information recording medium has the configuration to record content encrypted by an encrypting processing in CBC mode which executes with data the same size as that of said shuffled elements as a unit.

30. The information processing device of claim 25, wherein said scrambled content further includes, as scrambling processing data, at least one of the following:

(1) a portion of I-picture slice encoded data included in MPEG encoded data; and (2) a portion of the sequence header.

31. An information processing method for executing content recording processing to an information recording medium, said method comprising:

acquiring a scramble rule to apply to the content to be recorded on the information recording medium, wherein said scramble rule describes a previously set settings value;

generating scrambled content by executing the scrambling processing as to the content, according to the acquired scramble rule, wherein the scrambling processing includes Exclusive-OR computing processing of:

(a) content data which includes PID data including a data-type information within a transport stream packet; and (b) said previously set settings value or a value calculated based on said previously set settings value; and recording:

(a) the generated scrambled content;

(b) table describing locations of the content data which includes said PID data including said data-type information within said transport stream packet executed in the Exclusive-OR computing processing; and (c) the scramble rule applied to the content which includes said PID data including said data-type information within said transport stream packet, onto an information recording medium.

32. An information processing method for executing playback processing of content recorded on an information recording medium, said method comprising:

descrambling the content recorded on the information recording medium, wherein said descrambling includes Exclusive-OR computing processing of:

(a) content data which includes said PID data including said data-type information within said transport stream packet; and (b) a previously set settings value or a value calculated based on the settings value;

deciphering a scramble rule which corresponds to the content which includes said PID data including said data-type information within said transport stream packet stored in said information recording medium, wherein said scramble rule describes said previously set settings value; and based on the results of said deciphered scramble rule, descramble the scramble rule for a plurality of acquired individual scrambled content data which includes said PID data including said data-type information within said transport stream packet, wherein locations of scrambled content data are found based on a table describing the locations of the scrambled content data.

33. A computer readable medium encoded with a computer program for executing content recording processing to an information recording medium with a computer, said program comprising:

a scramble rule acquiring step for acquiring a scramble rule to apply to the content to be recorded on the information recording medium, wherein said scramble rule describes a previously set settings value;

a generating step for generating scramble content by executing scrambling processing as to the content, according to the scramble rule acquired in said scramble rule acquiring step, wherein the scrambling processing includes Exclusive-OR computing processing of:
(a) content data which includes PID data including a data-type information within a transport stream packet; and
(b) said previously set settings value or a value calculated based on said previously set settings value; and a step for recording:
(a) the generated scrambled content;
(b) a table describing locations of the content data which includes said PID data including said data-type information within said transport stream packet executed in the Exclusive-OR computing processing; and
(c) the scramble rule applied to the content which includes said PID data including said data-type information within said transport stream packet, onto an information recording medium.

34. A computer readable medium encoded with a computer program for executing playback processing of the content recorded on the information recording medium with a computer, said program comprising:

a scrambling processing step for executing descrambling processing of the content recorded on the information recording medium, wherein said descrambling processing includes Exclusive-OR computing processing of:
(a) content data which includes PID data including a data-type information within a transport stream packet; and
(b) a previously set settings value or a value calculated based on the settings value;

a scramble rule analyzing step for executing analyzing of a scramble rule which is the scrambling processing information corresponding to the content which includes said PID data including said data-type information within said transport stream packet stored in said information recording medium, wherein said scramble rule describes said previously set settings value; and a descrambling step for, based on the results of said scramble rule analyzing step, executing descrambling processing corresponding to the scramble rule for the acquired individual scrambled content data, wherein locations of scrambled content data are found based on a table describing the locations of the scrambled content data which includes said PID data including said data-type information within said transport stream packet.

* * * * *